(12) United States Patent
Brown et al.

(10) Patent No.: US 8,827,216 B2
(45) Date of Patent: Sep. 9, 2014

(54) CONCENTRIC RING GIMBAL SUPPORT SYSTEM

(75) Inventors: Garrett W. Brown, Philadelphia, PA (US); Anthony D. Sacksteder, Philadelphia, PA (US); Micah Black, Granite Bay, CA (US); David G. Asmann, Harleysville, PA (US)

(73) Assignee: Garrett W. Brown, Philadelphia, PA (US)

( * ) Notice: Subject to any disclaimer, the term of this patent is extended or adjusted under 35 U.S.C. 154(b) by 361 days.

(21) Appl. No.: 12/677,177

(22) PCT Filed: Mar. 17, 2009

(86) PCT No.: PCT/US2009/037384
§ 371 (c)(1),
(2), (4) Date: Mar. 9, 2011

(87) PCT Pub. No.: WO2010/030404
PCT Pub. Date: Mar. 18, 2010

(65) Prior Publication Data
US 2011/0155866 A1    Jun. 30, 2011

Related U.S. Application Data

(63) Continuation-in-part of application No. PCT/US2008/076331, filed on Sep. 13, 2008.

(60) Provisional application No. 60/972,979, filed on Sep. 17, 2007.

(51) Int. Cl.
| | | |
|---|---|---|
| A47F 5/05 | (2006.01) |
| F16M 11/00 | (2006.01) |
| B25B 17/00 | (2006.01) |
| B25H 1/00 | (2006.01) |
| F16M 11/12 | (2006.01) |
| F16M 13/04 | (2006.01) |
| F16M 11/04 | (2006.01) |

(52) U.S. Cl.
CPC ........... B25H 1/0021 (2013.01); F16M 11/123 (2013.01); F16M 13/04 (2013.01); *F16M 2200/068* (2013.01); F16M 11/04 (2013.01)
USPC .... 248/124.1; 248/62; 248/219.1; 248/227.3; 248/229.1; 248/540; 248/74.1; 248/229.23; 248/229.13; 248/315; 248/313; 248/683; 81/57.24; 81/57.35; 81/57.4

(58) Field of Classification Search
USPC .......... 248/124.1, 128.1, 219.1, 227.3, 229.1, 248/540, 62, 74.1, 229.23, 229.313, 229.13, 248/315, 313, 583; 81/57.24, 57.35, 57.4; 74/5.34
See application file for complete search history.

(56) References Cited

U.S. PATENT DOCUMENTS

| | | | | |
|---|---|---|---|---|
| 1,494,638 | A | * | 5/1924 | Sheldon ........................ 384/553 |
| 1,505,567 | A | * | 8/1924 | Kelley ............................ 81/119 |
| 1,674,669 | A | | 6/1928 | Percy |
| 3,333,613 | A | | 8/1967 | Bosse |
| 3,540,719 | A | | 11/1970 | Romney |
| 3,694,888 | A | | 10/1972 | Bosse |
| 3,917,200 | A | | 11/1975 | Johnson |
| 4,158,490 | A | * | 6/1979 | Gottschalk et al. ........... 352/243 |
| 4,265,147 | A | | 5/1981 | Fox |
| 4,474,439 | A | * | 10/1984 | Brown .......................... 352/243 |
| RE32,213 | E | | 7/1986 | Brown |
| 4,610,560 | A | | 9/1986 | Miller |
| 4,700,827 | A | | 10/1987 | Haaser |
| 4,805,615 | A | | 2/1989 | Carol |
| 5,109,736 | A | | 5/1992 | Dixon |
| 5,111,983 | A | | 5/1992 | Simmons et al. |
| 5,135,190 | A | | 8/1992 | Wilson |
| 5,360,196 | A | | 11/1994 | DiGiulio et al. |
| 5,544,554 | A | | 8/1996 | Brightly |
| 5,669,122 | A | | 9/1997 | Benoit |
| 5,857,815 | A | | 1/1999 | Bailey et al. |
| 6,149,506 | A | | 11/2000 | Duescher |
| 6,393,708 | B1 | | 5/2002 | Culver et al. |
| 6,431,514 | B1 | * | 8/2002 | Ailing ........................... 248/315 |
| 6,708,935 | B2 | | 3/2004 | Smeed |
| 6,711,972 | B1 | | 3/2004 | Joyner et al. |
| 6,852,107 | B2 | | 2/2005 | Wang et al. |
| 6,896,230 | B2 | | 5/2005 | Cvek |

| | | | |
|---|---|---|---|
| 6,923,505 | B2 | 8/2005 | Siminovitch et al. |
| 7,055,789 | B2 | 6/2006 | Libbey et al. |
| 7,290,744 | B2 | 11/2007 | Baldasari |
| 7,412,754 | B2 | 8/2008 | Hanson |
| 7,618,016 | B2 | 11/2009 | Brown |
| 2005/0023015 | A1 | 2/2005 | Argento |
| 2006/0065801 | A1 | 3/2006 | Anderson |
| 2006/0186281 | A1 | 8/2006 | Thiessen |

FOREIGN PATENT DOCUMENTS

| | | |
|---|---|---|
| DE | 8904387 U1 | 6/1989 |
| EP | 0192253 | 8/1986 |
| EP | 0429008 | 5/1991 |
| EP | 1312251 | 5/2003 |
| GB | 598231 | 10/1947 |
| GB | 2170651 | 8/1986 |
| GB | 2325393 | 11/1998 |
| WO | 0016950 | 3/2000 |
| WO | 20060113416 | 10/2006 |
| WO | 20080112687 | 9/2008 |

OTHER PUBLICATIONS

Supplementary European Search Report dated Apr. 20, 2011 for European Patent Application No. 08799533.8.
Information Disclosure Statement dated Jan. 13, 2010 for U.S. Appl. No. 11/859,526.
Office Action dated Oct. 13, 2006 for U.S. Appl. No. 11/060,612.
Response to Oct. 13, 2006 Office Action for U.S. Appl. No. 11/060,612.
Office Action dated Dec. 28, 2006 for U.S. Appl. No. 11/060,612.
Response to Dec. 28, 2006 Office Action for U.S. Appl. No. 11/060,612.
Office Action dated Jun. 19, 2007 for U.S. Appl. No. 11/060,612.
Response to Jun. 19, 2007 Office Action for U.S. Appl. No. 11/060,612.
Office Action dated Nov. 13, 2008 for U.S. Appl. No. 11/737,567.
Notice of Allowability dated Oct. 9, 2007 for U.S. Appl. No. 11/060,612.
Office Action dated Apr. 13, 2010 for U.S. Appl. No. 11/859,526.
Information Disclosure Statement dated Feb. 23, 2010 for U.S. Appl. No. 12/674,731.
International Search Report and Written Opinion dated Nov. 7, 2008 for PCT Patent Application No. PCT/US2008/074554.
International Search Report & Written Opinion dated Nov. 28, 2008 for PCT/US08/76331.
International Search Report & Written Opinion dated May 12, 2009 for PCT/US09/37384.
Extended European Search Report for European Patent Application No. 09813385.3 dated Apr. 28, 2014.

\* cited by examiner

*Primary Examiner* — Terrell McKinnon
*Assistant Examiner* — Christopher Garft
(74) *Attorney, Agent, or Firm* — Schnader Harrison Segal & Lewis LLP

(57) ABSTRACT

A tool support system is disclose having a yoke; a plurality of concentric rings having at least one ring pivotally connected to the yoke; a tool fastening mechanism to secure a tool in the support system; and one or more rotation components to permit the tool to rotate within a ring of the support structure. One or more of the concentric rings can be added to the system or can replace one or more concentric rings to accommodate tools of different sizes. The invention includes a method of configuring a support apparatus and a support apparatus kit with various interchangeable parts, and parts that can be built out to varying degrees to permit the support structure to be used on numerous types of tools.

29 Claims, 27 Drawing Sheets

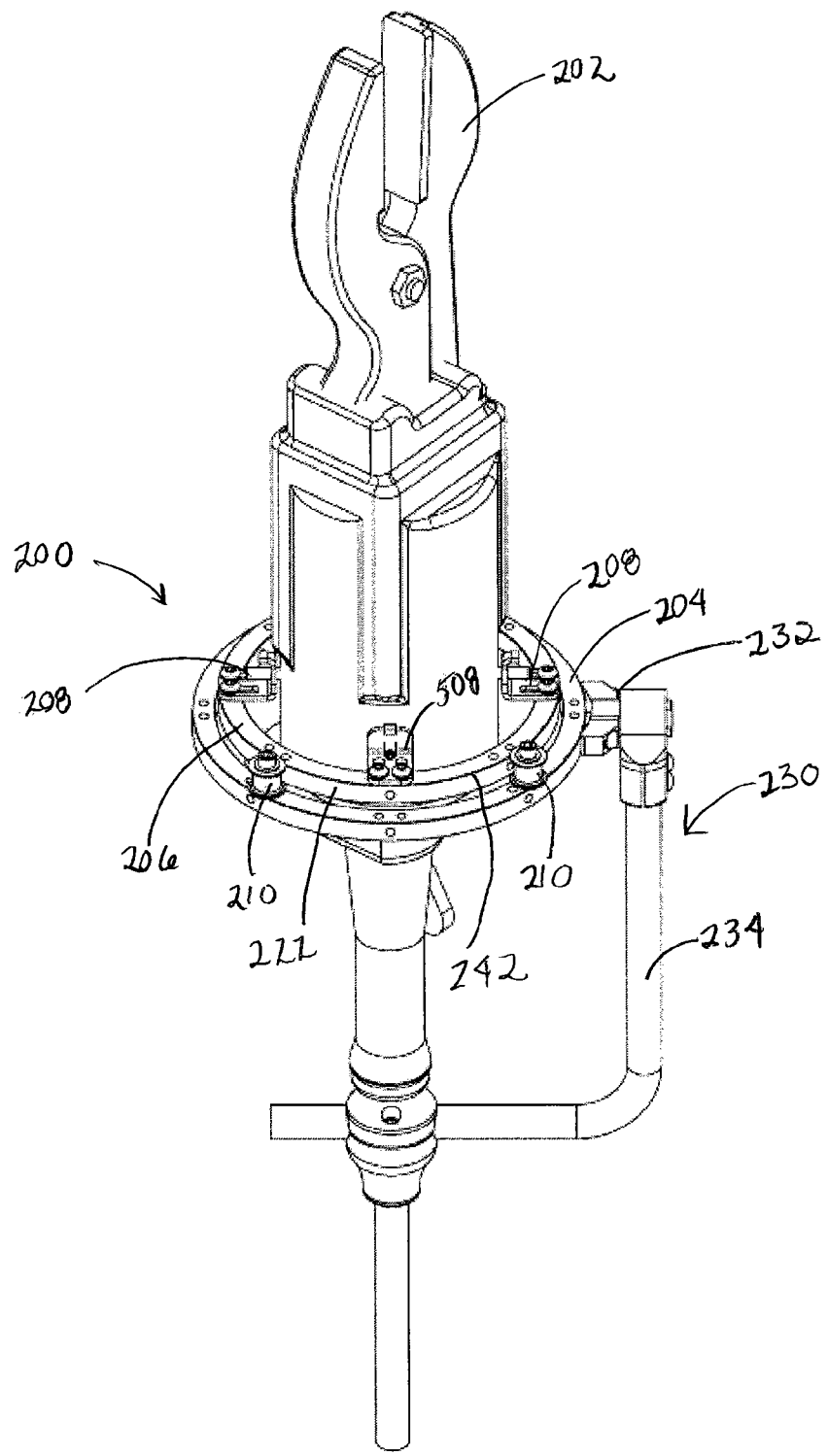

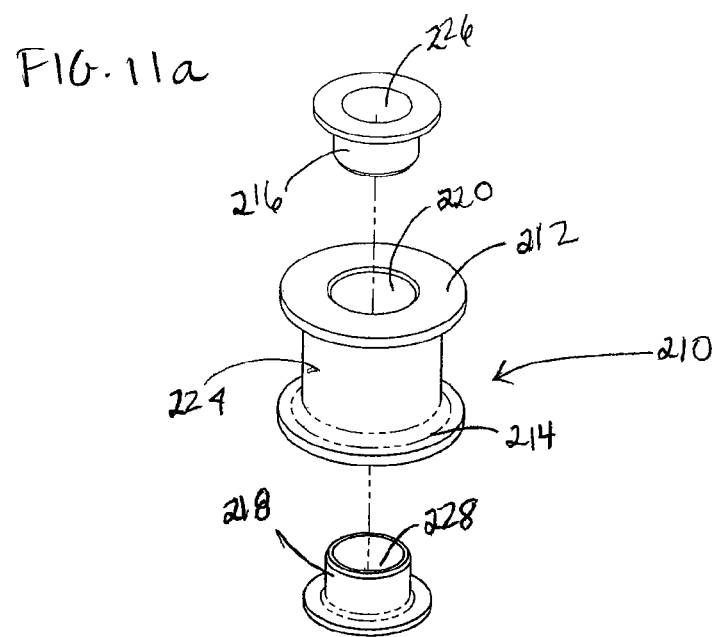
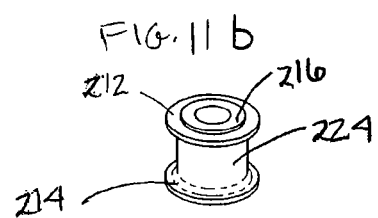

CONCENTRIC RING GIMBAL SUPPORT SYSTEM

This application is based on and claims priority to, PCT Patent Application PCT/US2008/076331, filed Sep. 13, 2008, entitled Gimbal for Tool Support, which claims priority to U.S. Patent Application 60/972,979, filed Sep. 17, 2007, entitled, Removable Gimbal for Tool Support, both of which are incorporated herein by reference.

BACKGROUND OF THE INVENTION

In many industrial and business environments, workers are often required to repetitively lift, position and orient tools, sometimes of significant weight, and deploy them anywhere within the reach of their arms, from low to overhead to extend out in front. The resulting stresses, particularly from overhead usages, or near-full extension of the arm, are a common cause of work-related shoulder and forearm injuries.

Ergonomic equipment supports are known in the art, including 'tool balancers' that suspend tools on wires from retractable reels. Tool balancers require unobstructed access to overhead, usually fixed, attachment points, which tend to restrict the users lateral freedom of movement. Also, since the tools usually dangle in a bottom heavy condition from crude attaching eyelets, maintaining a desired angular orientation is impeded. Even those few balancer installations that connect to annular bearings around the tool body are still restrictive of other axes of freedom. Furthermore, they can only be installed on tools of a cylindrical construction that permit the unobstructed passage of the inner bearing race along the tool body to the desired point of attachment. Importantly, such balancers cannot be used at all for work locations that are inaccessible to overhead support, such as underneath cars on assembly lines.

Articulated support arms that do not require overhead mounting exist for supporting cameras and medical devices such as x-ray machines. Some may include two or three-axis gimbal attachments to provide angular freedom between the arm and the supported equipment, but these gimbal designs are not appropriate for the majority of tool configurations and/or conditions of use. Additionally, the center-of-gravity of a given tool is often located within a non-cylindrical section of the tool body, which may be inaccessible to the sliding installation of a bearing of appropriate size. Conventional gimbals also cannot be conveniently and quickly removed to facilitate the use of the tool in a separate location, or the rapid replacement of the tool with another. The use of conventional three-axis gimbals would mandate a proliferation of expensive supporting and orienting means, each adapted to a different tool, to be located within the same workplace or production line station.

Accordingly, there is a need for versatile, ergonomic, and angularly agile tool support systems, which can accommodate tools of various sizes, shapes, configurations and internal distributions of mass. There is also a need for a support system allowing the quick replacement and substitution of tools within the local workplace, without cluttering the tools with redundant and expensive affixed hardware.

What is needed is a quickly removable gimbal attachment, adaptable to be mounted around the tool's center-of-mass, and that provides substantially unrestricted angular freedom for orienting and positioning a variety of tools, but is preferably not bulky or expensive.

What is also needed is an angularly agile tool mount that can accommodate a tool around its center of mass, even if obstructions, bends, bulges or projections prevent the sliding installation of a conventional, unitary bearing assembly.

SUMMARY OF THE INVENTION

Illustrative embodiments of the invention are directed to a supporting and orienting apparatus that is angularly agile and can balance the weight of tools, and that preferably permits quick tool or tool component replacement or substitution. Particular embodiments of the invention can be installed around tool-body locations that preclude the use of traditional tool mounts providing rotational freedom.

Embodiments of the invention provide a support and orienting system for tools or other objects. "Tools" is used herein in a broad sense and includes various types of equipment, instruments and devices.

A support system according to an illustrative embodiment of the invention comprises a yoke; a plurality of concentric rings having at least one ring pivotally connected to the yoke; a tool fastening mechanism engagable with at least one ring and with a tool to secure the tool within the at least one ring; and one or more rotation components functionally disposed adjacent to at least one ring thereby allowing the tool to rotate within at least one of the concentric rings; and wherein one or more of the concentric rings can be added to the system or can replace one or more concentric rings to accommodate tools of different sizes.

In a particular embodiment of the invention the rotation component is a spool-shaped object or roller with at least one flange at one end. The roller is positioned in the system so it interfaces with a ring to permit the ring to rotate with respect to the object to which the rotation component is connected.

The tool fastening mechanism may comprise one or more brackets configured to be connected to a tool and to rotation components that interface with a ring, or to the ring directly, in which case the rotation component is rotatably connected to a ring.

The yoke may have a single arm, attached to a ring at one point, or a double arm, in which case each arm is rotatably attached to the ring. The yoke may be modular in construction, thereby allowing various yoke configurations to be used. This flexibility may permit the support structure to be used with a wide variety of tools.

The invention further includes a method of configuring a support apparatus and a support apparatus kit, with various interchangeable parts, and parts that can be built out to varying degrees to permit the support structure to be used on numerous types of tools.

DESCRIPTION OF THE DRAWINGS

For further detail regarding illustrative embodiments of the invention, reference is made to the detailed description provided below, in conjunction with the following illustrations:

FIG. 10 depicts a tool support with a tool according to an illustrative embodiment of the invention.

FIGS. 11a-d depict a rotation component and parts thereof according to an illustrative embodiment of the invention.

DETAILED DESCRIPTION OF THE INVENTION

Illustrative embodiments of the invention offer a support and orienting apparatus that can provide numerous degrees of freedom. Preferably, one or more of the system's elements are modular, sectional, removable and/or capable of disassembly in order to provide mounting flexibility and/or interchangeability, as well uncluttered access to the tool.

Figure 1A:
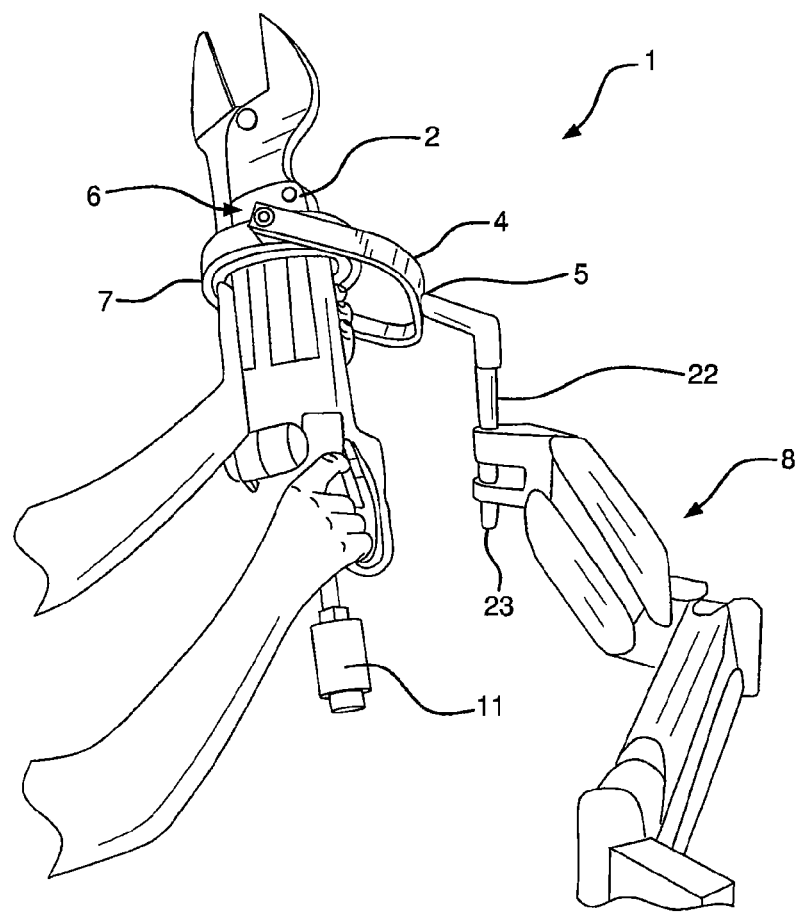
FIG. 1a depicts a 'squeezer' rivet tool mounted in a gimbal assembly attached to an articulated support arm shown at nearly its highest position according to an illustrative embodiment of the invention.

FIG. 1a depicts a tool support system according to an illustrative embodiment of the invention. A 'squeezer' rivet tool 2 is shown mounted in a gimbal assembly 1 attached to an articulated support arm 8, shown at nearly its highest position. For many applications it is preferable that the gimbal assembly is removable from the articulated support arm 8 and/or that various parts within the assembly are detachable from one another, particularly in a readily removable manner. Rivet tool 2 is captured at nearly its longitudinal center of balance within gimbal assembly 1. Balancing component 11 provides a balance adjustment so the tool can be balanced around a line between outer gimbal portion pivot locations 6 on yoke 4. The balancing component can be adjustable, such as by including substitutable weights or an adjustment to the weight's location, to effectively adjust the center of mass of the tool. Inner gimbal portion 9, as more clearly seen in FIG. 1b, rotates by engaging a plurality of roller wheels 16 (see FIG. 2b) preferably attached symmetrically around the inner surface of outer gimbal portion 7, and also pivots around outer gimbal portion pivots 6 and in an additional plane via yoke pivot 5.

Figure 1B:
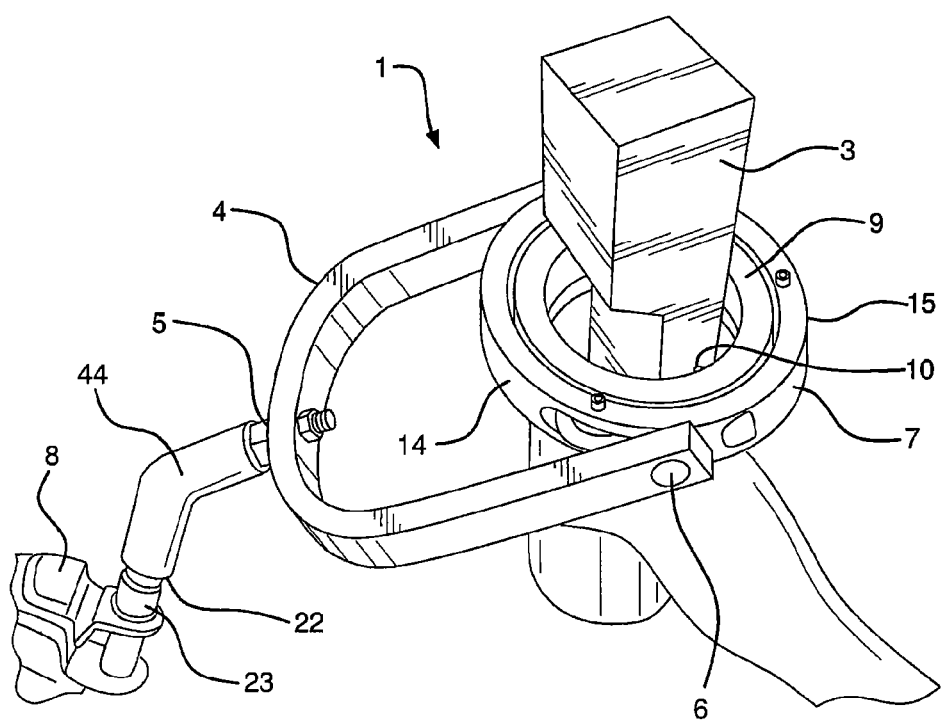
FIG. 1b shows a gimbal with a bucking bar mounted within an inner gimbal portion, which is rotatable within a wheeled outer gimbal portion that is pivotally attached to a gimbal yoke that is itself pivotable around an additional axis according to an illustrative embodiment of the invention.

Advantageously, the angular freedom created by the movement of the inner gimbal portion within the outer gimbal portion allows the user to orient the tool by rotation of the user's wrist and/or arm, closely mimicking unsupported tool use. This added degree of freedom greatly enhances the benefits of the support system. The swiveling action of yoke mounting socket 22 around arm mounting post 23 provides an additional degree of freedom. Therefore, as can be seen in FIG. 1b, a total of four axes of angular freedom for tool 2 are provided in this embodiment. Additional degrees of freedom can be provided by adding pivotally connected components at various locations. In a preferred embodiment of the invention, the combination of the gimbal and the support arm permits positioning and orientation of a heavy tool almost anywhere within reach of the operator's arms, and in almost any direction, with only fingertip pressure, and relieves the continual strain of supporting and accurately pointing a burdensome object. Although some aspects of the invention are described with respect to heavy objects, embodiments of the invention can be used for relatively lightweight tools.

FIG. 1b shows a tool support according to an illustrative embodiment of the invention. A gimbal assembly 1 is mounted by means of yoke socket 22 to arm mounting post 23, which is attached to articulated support arm 8 (partially visible). A 'bucking bar' 3 is mounted within inner gimbal portion 9 by means of a plurality of mounting set screws 10, which engage bucking bar 3 at approximately its longitudinal center of balance. Inner gimbal portion 9 is preferably arcuately segmented to facilitate insertion of a tool. For certain applications it may not be necessary to segment inner gimbal portion 9.

Inner gimbal portion 9 is rotatable within wheeled outer gimbal portion 7. The wheels provide freedom of movement of inner gimbal portion 9 within outer gimbal portion 7. This effect can also be achieved with the wheels positioned on inner gimbal portion 9 and engaged with a race in outer gimbal portion 7. Other mechanisms to provide freedom of movement can be used, such as ball bearings or low friction materials. An example of use of a low friction material includes a circumferential channel on the inner surface of outer gimbal portion 7, with a complimentary ridge on the outer surface of inner gimbal portion 9, or vice versa, wherein the channel and/or ridge are fabricated of a low friction material such as Teflon®.

FIG. 1*b* shows outer gimbal portion 7 pivotally attached via outer gimbal portion pivot 6 to gimbal yoke 4, which is itself pivotable around an additional axis by means of yoke pivot 5. This combination enables a worker to position and precisely orient the bucking bar (which provides reactive mass to counter the impact of rivet-pounding tools).

Figure 2A:
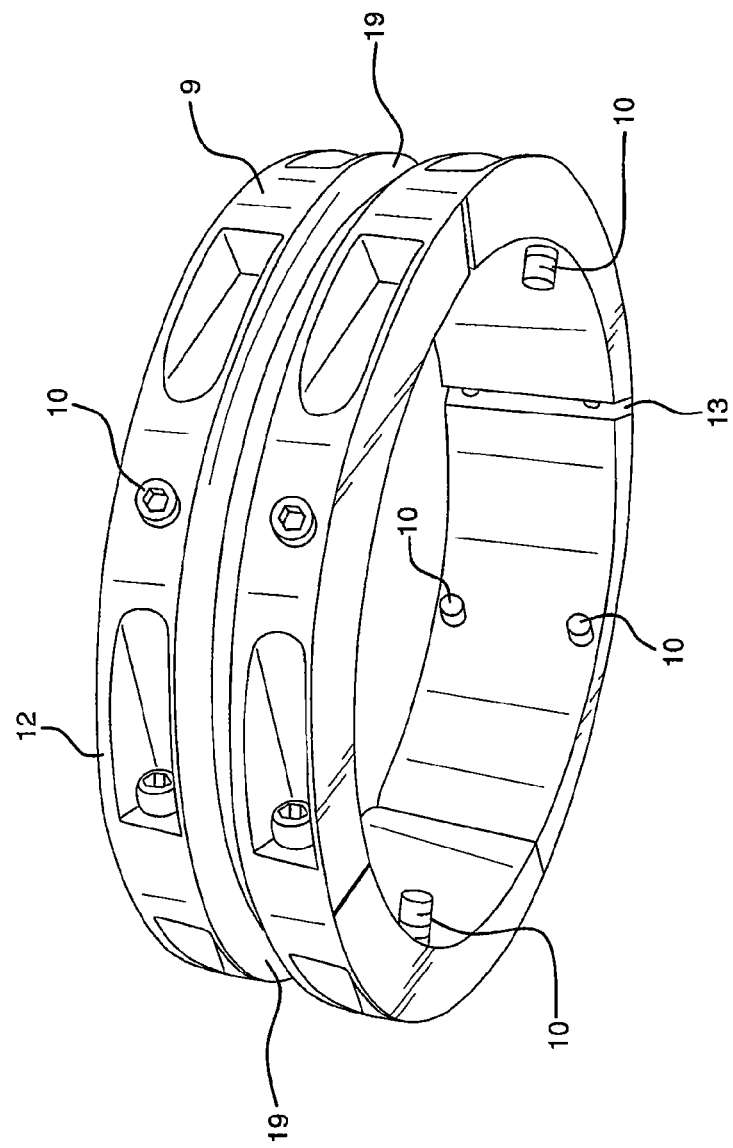
FIG. 2a depicts a four-section inner gimbal portion assembly including a grooved central track to accept roller wheels of an outer gimbal portion according to an illustrative embodiment of the invention.
Figure 2B:
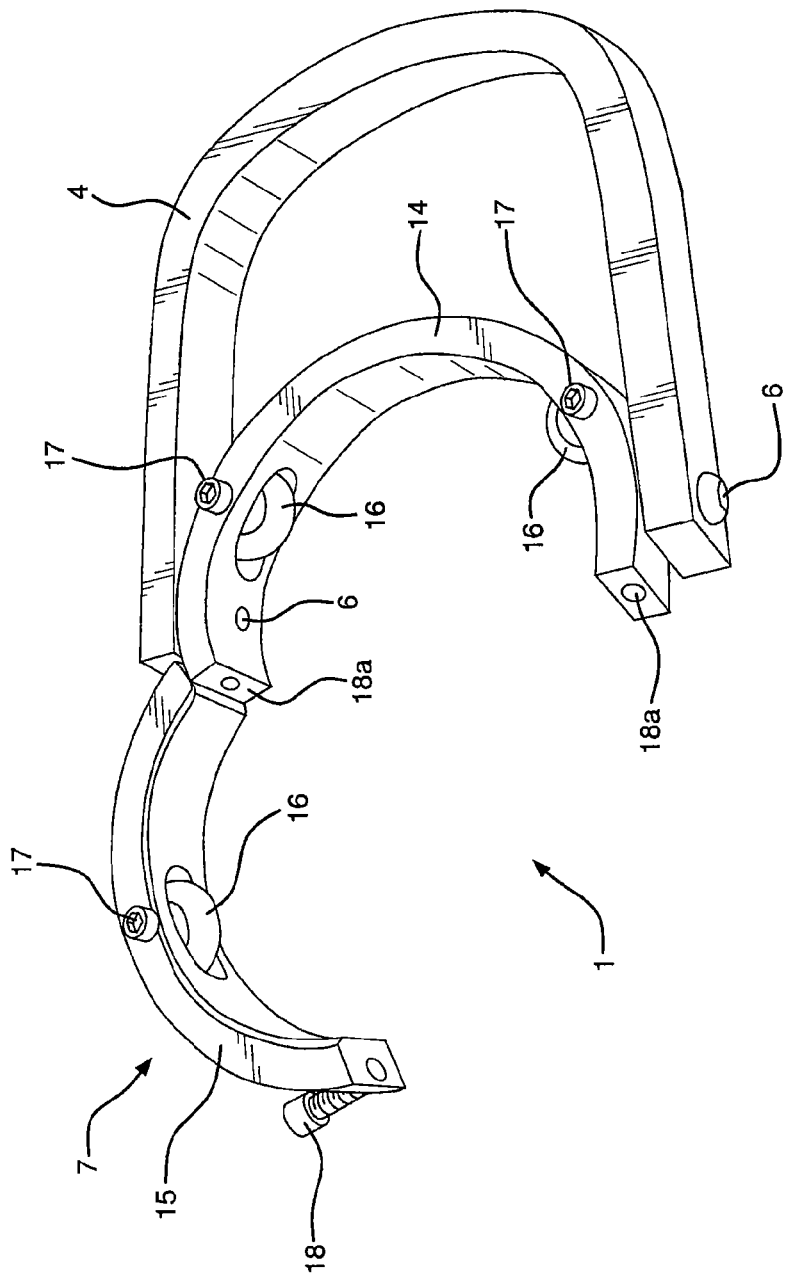
FIG. 2b shows a separated two-section, outer gimbal portion including roller wheels, yoke pivots and gimbal yoke according to an illustrative embodiment of the invention.
Figure 4A:
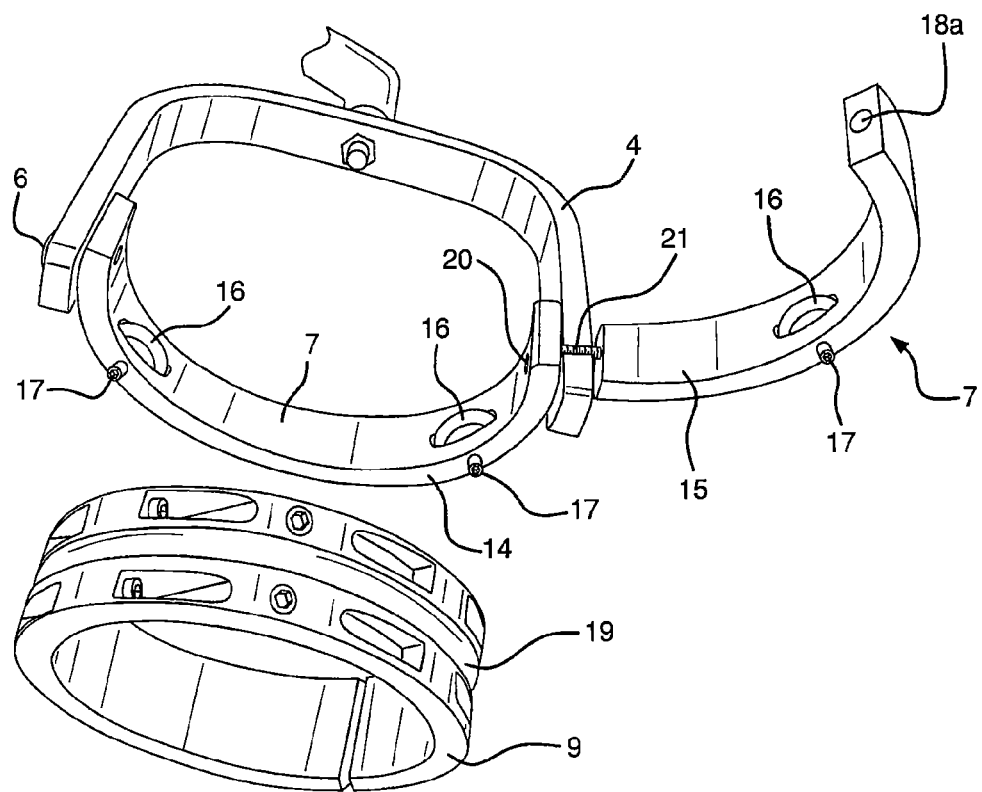
FIG. 4a depicts a hinged gated outer gimbal portion shown in the open position, with its sectional inner gimbal portion assembly removed according to an illustrative embodiment of the invention.

Turning now to FIGS. 2*b* and 4*a*, viewed in conjunction with FIG. 1*b*, replacement of the bucking bar will now be explained. In an illustrative embodiment of the invention, support arm 8 can be 'docked', for example by engaging a conventional pin and socket. The bucking bar 3 can be tilted to lie horizontally in outer gimbal portion major section 14 (see FIGS. 2*b* and 4*a*). By unclamping the gated minor section 15 of outer gimbal portion 7 and swinging it open on its hinge, bucking bar 3 with its inner gimbal portion 9 attached can be lifted out and quickly replaced by a version with a different profile, for example, but with its own pre-mounted inner gimbal portion.

FIG. 2*a* shows an inner gimbal portion assembly 9 according to an illustrative embodiment of the invention, adapted to be either clamped, by radial clamping screws 12 and/or a plurality of mounting set screws 10, so that even an irregularly-shaped tool can be securely attached to the assembly. Track groove or race 19 captures roller wheels 16 associated with outer gimbal portion 7, to allow inner gimbal portion 9 to rotate freely within outer gimbal portion 7 while being held in place. Pinch grooves 13 can be provided to prevent resilient material disposed on a tool from bulging between inner gimbal portion segments and interrupting the rolling integrity of inner gimbal portion 9 within outer gimbal portion 7. The track rollers or wheels should have slightly smaller sectional diameters than the corresponding track grooves in which they are to ride.

FIG. 2*b* depicts a gimbal assembly 1 according to an illustrative embodiment of the invention, showing major outer gimbal portion segment 14 and minor outer gimbal portion gate 15 in an opened position. Clamp screws 18 (only one shown) attach outer gimbal portion segments 14, 15 to one another at clamp screw locations 18*a*.

Note that one or more over-centers clamps 25 (see FIG. 6), of the sort that seal 'Mason Jars' could be employed, optionally in conjunction with a hinge to permit instantaneous opening of the outer gimbal portion gate and substitution of other tools fitted with appropriate inner gimbal portions. Other closing mechanisms that allow removal of inner gimbal portion 9 with the tool are within the spirit and scope of the invention. Preferably the mechanism allows easy opening and closing, but additional mechanisms may be useful or necessary depending in part on the type of tool and the use of the tool.

A plurality of roller wheels 16, turn on axles 17 and engage a track groove 19 of an inner gimbal portion to permit rotation of the inner gimbal portion. Yoke 4 is attached to outer gimbal portion 7 at pivot locations 6 by for example screws, as can be seen in FIG. 1*b*, which pass through pivot bearings within the extremities of yoke 4.

Figure 3A:
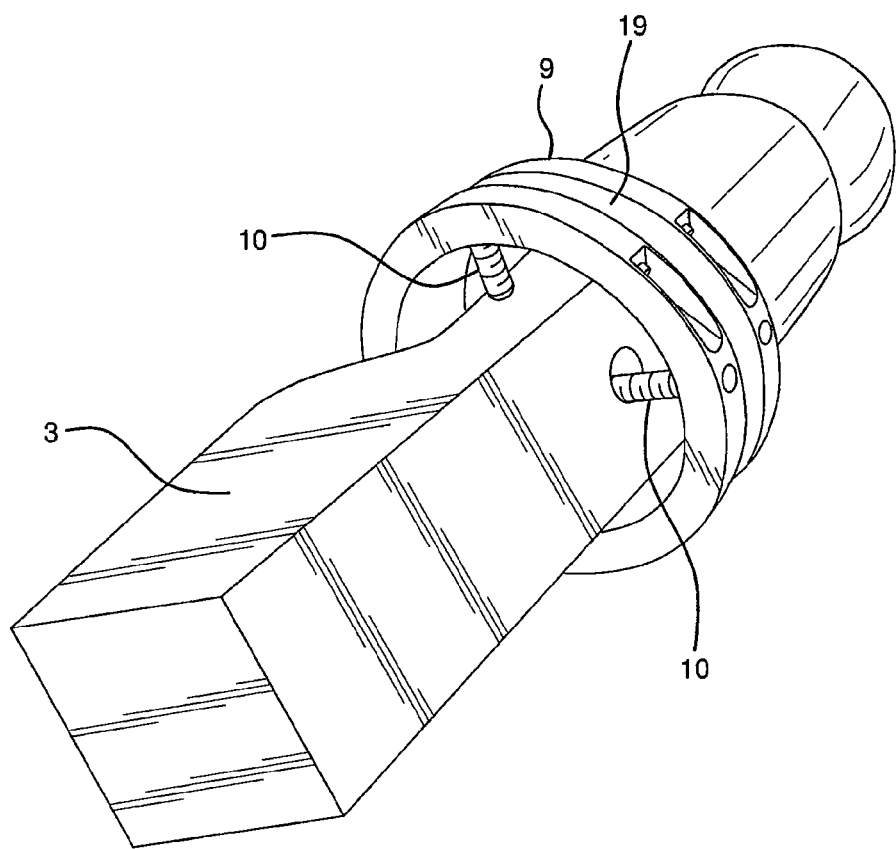
FIG. 3a shows an assembled two-section inner gimbal portion with circumferential track and mounted at the center of balance of a bucking bar by means of a plurality of set screws according to an illustrative embodiment of the invention.

FIG. 3*a* is an illustrative embodiment of a tool positioned in an inner gimbal portion assembly. FIG. 3*a* shows an assembled inner gimbal portion 9 with machined peripheral track 19, mounted at the longitudinal center of balance of bucking bar 3 by means of a plurality of set screws 10 positioned to appropriate lengths to engage accessible portions of the tool structure and, preferably, to permit any radial offset of the inner race track 19 in a direction that compensates for any irregularity in the axial center-of-balance of the tool—in this case caused by the central notch of missing steel in the construction of the bucking bar.

Figure 3B:
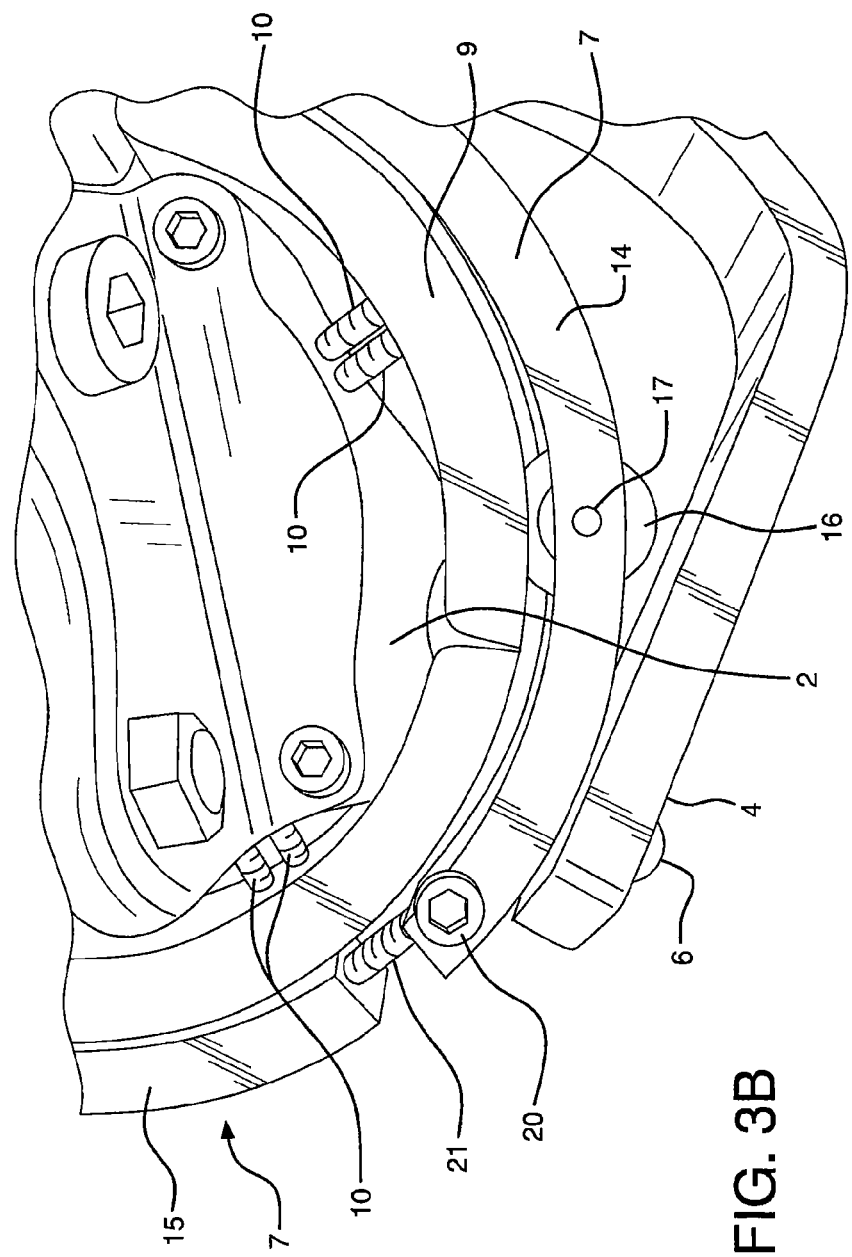
FIG. 3b shows a sectional inner gimbal portion mounted to the irregular surfaces of a rivet squeezer, also by means of a plurality of set-screws according to an illustrative embodiment of the invention.

FIG. 3*b* shows an illustrative embodiment of a portion of a sectional inner gimbal portion 9 mounted to the irregular surfaces of a rivet squeezer 2, by means of a plurality of set-screws 10. Circumferentially spaced rollers 16, turning on axles 17 mounted within notches in outer gimbal portion 7 engage a track in inner gimbal portion 9 to permit free rotation of rivet tool 2 within outer gimbal portion 7. Outer gimbal portion 7 consists of major segment 14 and minor segment 15 hinged together at gate hinge axle 20 to permit removal of rivet squeezer 2 together with the attached inner gimbal portion 9. Yoke 4 is pivotally engaged with outer gimbal portion 7 at yoke pivot locations 6.

FIG. 4*a* shows an illustrative embodiment of a gated outer gimbal portion 7 in an opened position, with its inner gimbal portion 9 removed. Gate section 15 can be unclamped from major section 14 and/or released by a screw fastening at screw location 18*a* to swing aside, as shown, around gate hinge axle 20, to permit removal of inner gimbal portion 9 and any associated tool. Roller wheels 16, turning on axles 17 engage track groove 19. When gate section 15 is in an open position, inner gimbal portion 9 can be removed from the apparatus as shown. Strategic bevels to the inner edges of segment 14 can be incorporated to facilitate removal of inner gimbal portion 9.

Figure 4B:
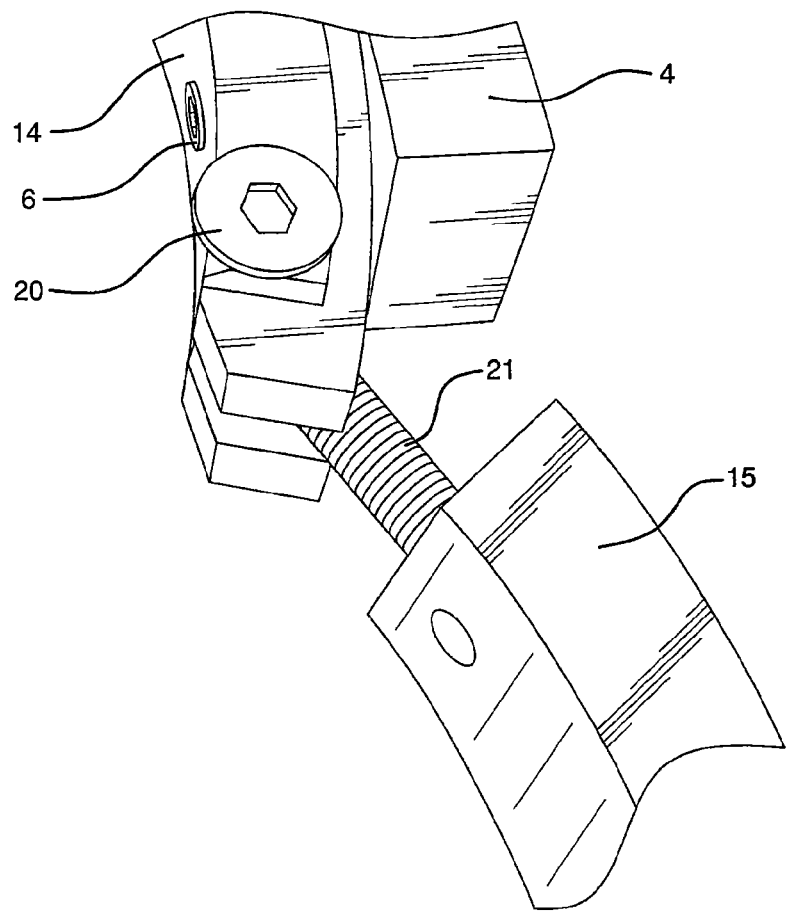
FIG. 4b shows a hinge offset beyond the centerline yoke pivot location according to an illustrative embodiment of the invention.

FIG. 4*b* depicts hinge axle 20 according to an illustrative embodiment of the invention. Outer gimbal portion minor segment 15 is shown in a position extended beyond the centerline that extends between the yoke pivot locations 6. Thus, outer gimbal portion segment 14 can pivot within yoke 4 even if minor outer gimbal portion segment 15 is swung aside. Gate hinge threaded eyebolt 21 permits gimbal portion segment 15 to be rotated in full-turn increments to adjust the diametric clearance between outer 7 and inner gimbal portion 9, and alter the tightness of engagement of wheels 16 with inner gimbal portion groove 19.

Figure 5A:
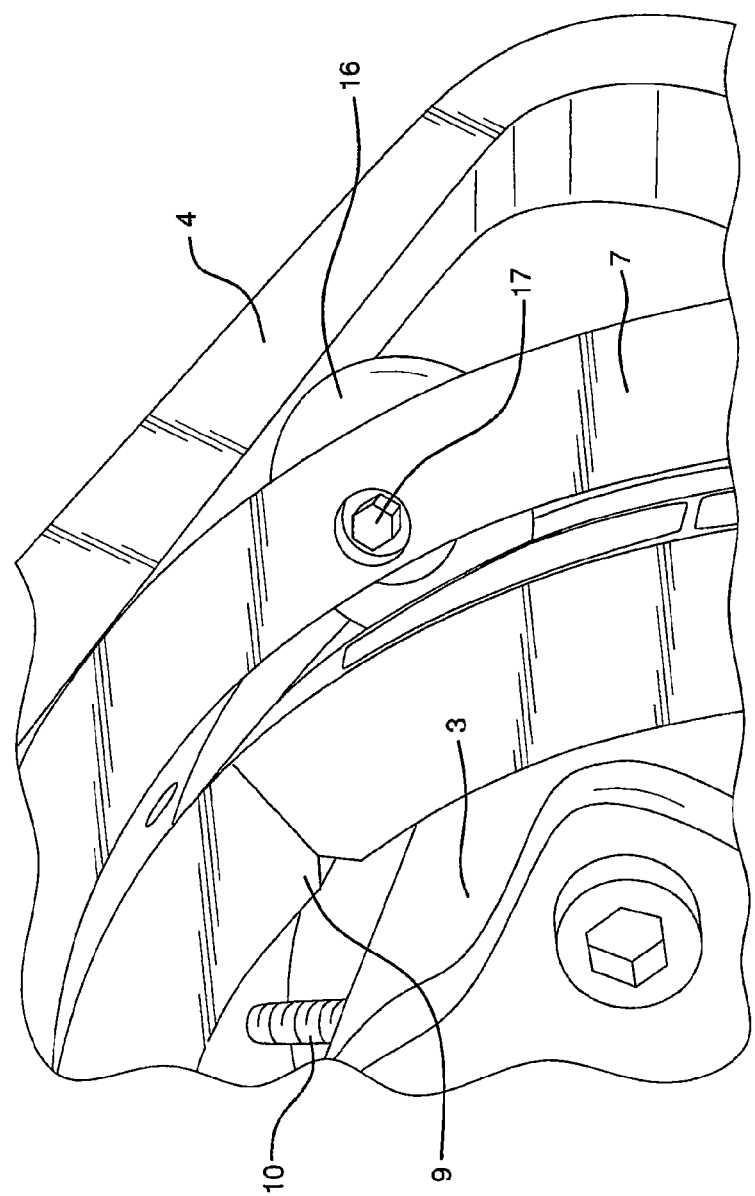
FIG. 5a depicts a V-shaped roller wheel mounted within an outer gimbal portion and engaging and capturing an inner gimbal portion groove according to an illustrative embodiment of the invention.

FIG. 5*a* depicts an illustrative embodiment of a roller wheel 16 mounted within outer gimbal portion 7 on axle 17 and engaging and capturing inner gimbal portion track groove 19. Inner gimbal portion 9 is shown attached to rivet tool 3 by means of a plurality of set screws 10.

Figure 5B:
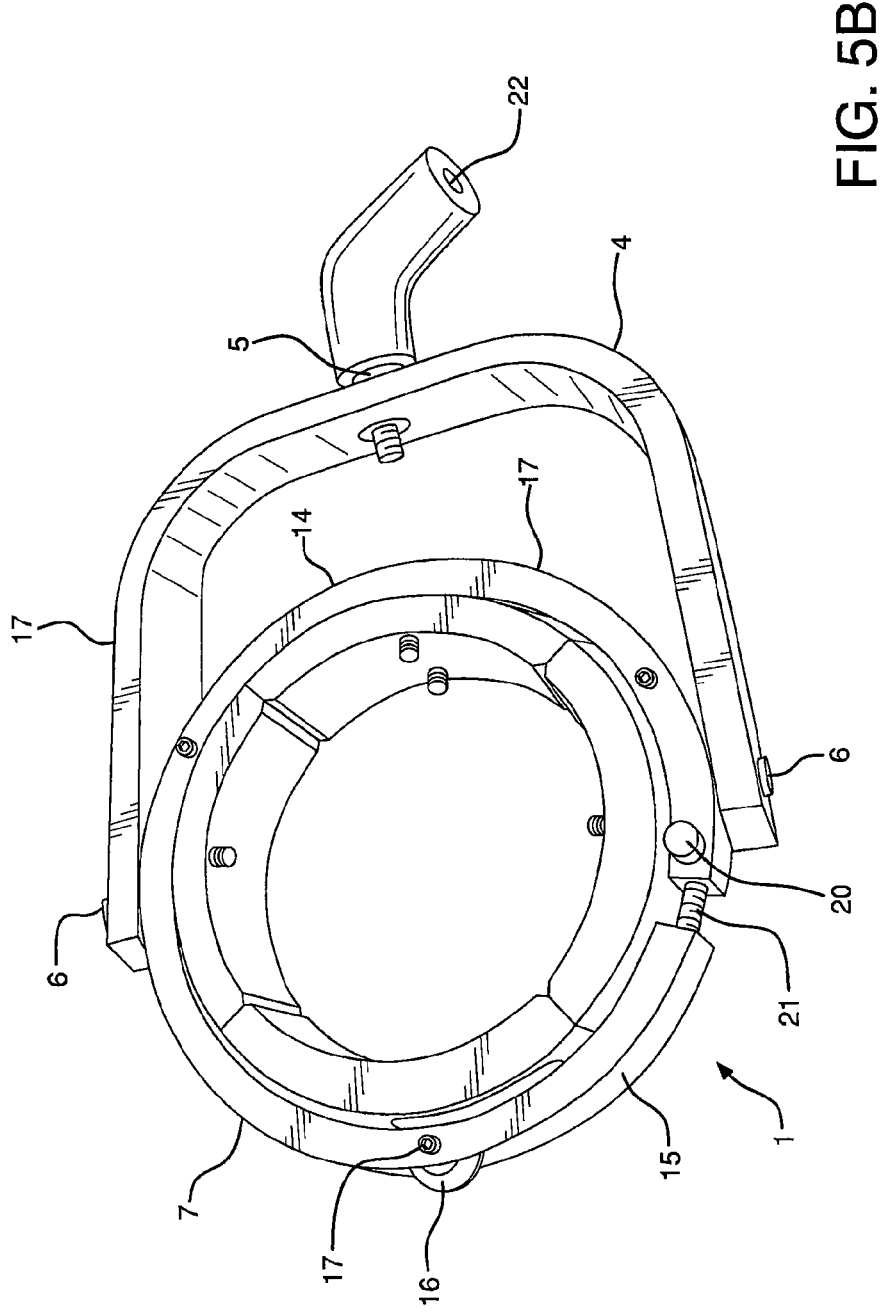
FIG. 5b shows a gated embodiment of a gimbal assembly including inner gimbal portion, outer gimbal portion with hinge and clamp, interconnecting wheels and doubly pivoting gimbal yoke according to an illustrative embodiment of the invention.

FIG. 5*b* shows an illustrative embodiment of a gimbal assembly 1. Inner gimbal portion 9 is disposed within outer gimbal portion 7. Outer gimbal portion 7 has hinge 20 to allow opening and closing of the gimbal portion. Wheels 16 are shown in this embodiment projecting from the exterior of outer gimbal portion 7 however, they may be situated flush with, or within the outer diameter of outer gimbal portion 7. The latter arrangements can provide protection of the wheels. Yoke 4 is shown pivotally connected to outer gimbal portion 7 at outer gimbal portion pivot locations 6 and to mounting socket 22 at yoke pivot 5.

Inner and outer gimbal portions 7 and 9 pivot around pivot axles 6 and pivot axis 5, which in this illustrative embodiment of the invention are about perpendicular to one another. Thus, gimbal assembly 1 provides three axes of angular freedom for a tool mounted within inner gimbal portion 9, not including any additional pivot points present, such as at the attachment point of gimbal assembly 1 to a support arm. Gimbal assembly 1 can be pivotally connected to a support arm (such as is shown in FIGS. 1*a* and 1*b*) by a yoke mounting socket 22 to provide the additional degree of angular freedom for the tool and associated gimbal assembly. Other attachment mechanisms can also be used. For example, the yoke structure may have a mounting post that fits within a mounting socket contained in the support arm or a mounting block attached thereto.

Figure 6:
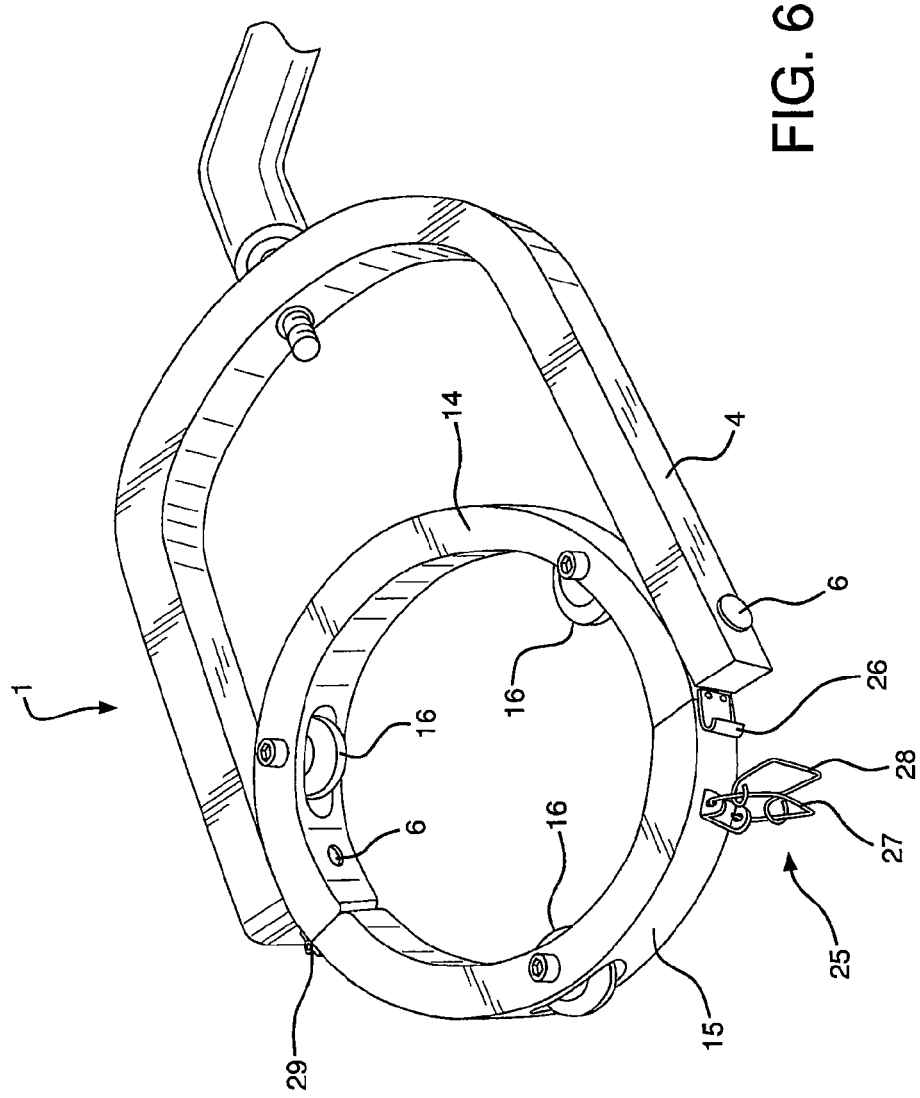
FIG. 6 shows a gimbal assembly including a hinged, clamping outer gimbal portion gate according to an illustrative embodiment of the invention.

FIG. 6 shows an illustrative embodiment of a gimbal assembly 1 including a hinged, outer gimbal portion gate having a minor outer gimbal portion segment 15 hinged to major outer gimbal portion segment 14 by hinge 29. Outer gimbal portion segments 14 and 15 are clamped together by an over-centers gate clamp assembly 25 having a gate clamp latch 26 engaged by clamp catch 28 and drawn tightly by clamp lever 27 in the manner of the well-known 'Mason jar' wire sealing clamps. Shown here in the unclamped mode, gate segment 15 can be swung away releasing an inner gimbal portion, having a tool encased therein, from engagement with roller wheels 16. When the tool and attached inner gimbal portion are re-installed, gate 15 can be swung shut and quickly clamped closed. Other clamps are within the spirit and scope of the invention, provided they can withstand any stresses created by tool and use of the apparatus.

Figure 7:
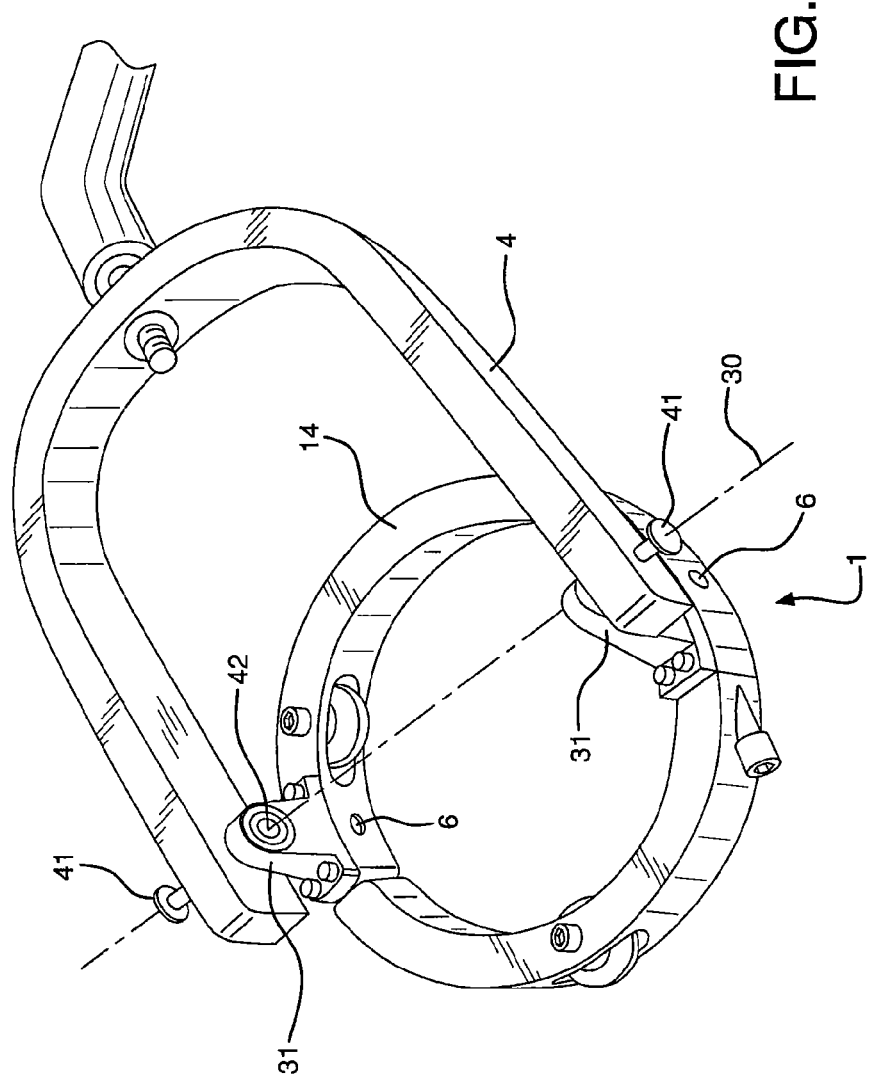
FIG. 7 shows a gimbal assembly including 'ears' to offset outer gimbal portion pivot locations to coincide with a tool's center-of-balance according to an illustrative embodiment of the invention.

FIG. 7 shows an illustrative embodiment of gimbal assembly 1 including pivot-mounting 'ears' 31 attached to outer gimbal portion major segment 14 or integral therewith. Pivot-mounting ears offset outer gimbal portion pivot locations 6 from the plane of outer gimbal portion 7 and coincide with axle centerline 30 in the event the center-of-balance of a tool is displaced from a possible mounting location with respect to an inner gimbal portion. In this embodiment, spring pins 41 engage pivot axis axle bearings 42, and if pulled apart also permit gimbal yoke 4 to be quickly removed.

Figure 8A:
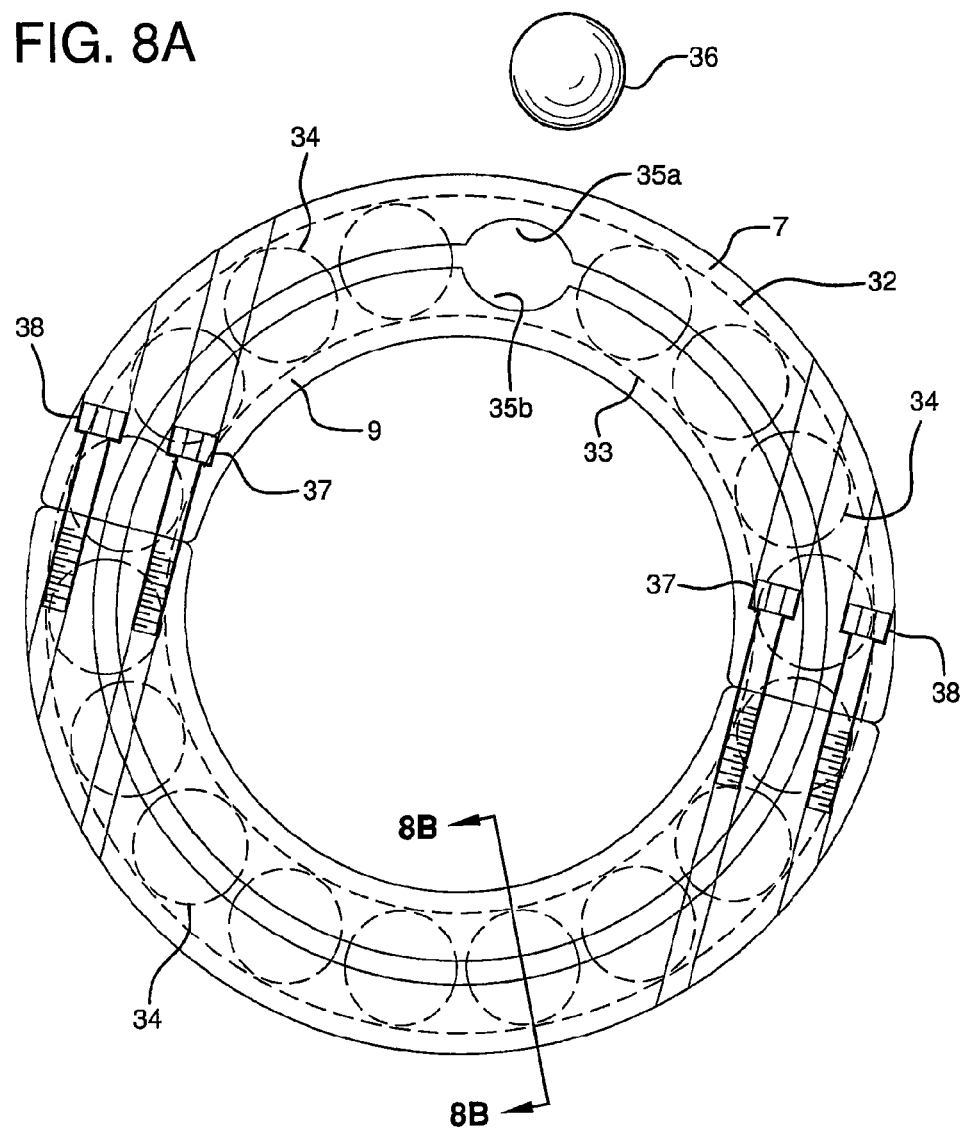
FIGS. 8a and 8b depict a gimbal employing segmented inner and outer gimbal portions and captured ball bearings inserted between them according to an illustrative embodiment of the invention.
Figure 8B:
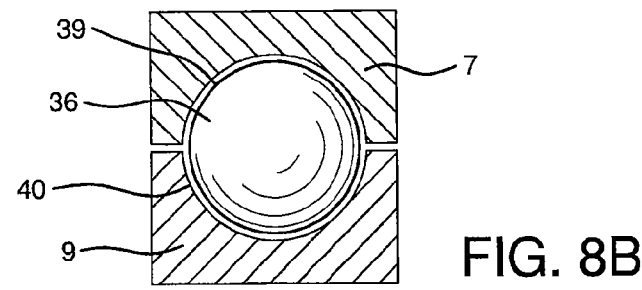

FIGS. 8a and 8b are cross-sections of an illustrative embodiment of a gimbal employing ball bearings to facilitate rotation of segmented inner and outer gimbal portions 9 and 7 with respect to one another. Inner and outer gimbal portions 9 and 7 may or may not be segmented in alternative embodiments of the invention. Outer gimbal portion 7 has a groove 39 disposed therein to accommodate ball bearings 36. Inner gimbal portion 9 has a groove 40 disposed therein, to accommodate ball bearings 36. The diameters of grooves 39 and 40 are slightly larger than the diameter of ball bearings 36, so ball bearings 36 can freely rotate therein with a minimum of amount wobbling. Ball bearing profiles 34 shown as dotted circles, indicate the position of ball bearings captured between gimbal portions 9 and 7 prior to final tightening. To install the assembly, inner gimbal portion 9 is positioned at the appropriate location on a tool body and secured using a clamping mechanism such as inner gimbal portion clamp screws 37 and/or set screws (such as shown in FIG. 2a). Inner gimbal portion 9, with tool in place, is positioned and aligned with outer gimbal portion 7. Outer gimbal portion 7 is then partly tightened, for example by using outer gimbal portion clamp screws 38, so that ball bearing insertion notches 35a and 35b coincide with one another and yet are sufficiently apart to permit insertion of the ball bearings. Once final ball bearings 36 are inserted, clamp screws 38 can be tightened, reducing the size of the opening formed by notches 35a and 35b, thereby retaining the ball bearings in a channel formed between gimbal portions 7 and 9. The channel in which the ball bearings are contained is shown by dotted lines 32 and 33. This configuration of gimbal portions and ball bearings permits relative rotation of inner gimbal portion 9 and outer gimbal portion 7. In the illustrative embodiment shown in FIG. 8a, both the inner and outer gimbal portions would be secured to the tool, and this entire structure is intended to be removed for tool replacement. This can be achieved for example, using an easily releasable gimbal yoke attachment, such as by pivot extension ears and spring pins (shown for example in FIG. 7). It is possible to utilize ball bearings in a configuration wherein the inner and/or outer gimbal portions can be disengaged without removal or loss of the ball bearings. The outer gimbal portion can have ball bearings trapped therein in the inside circumference and the inner gimbal portion can have a complimentary track on its outer circumference, or vice versa.

Figure 9:
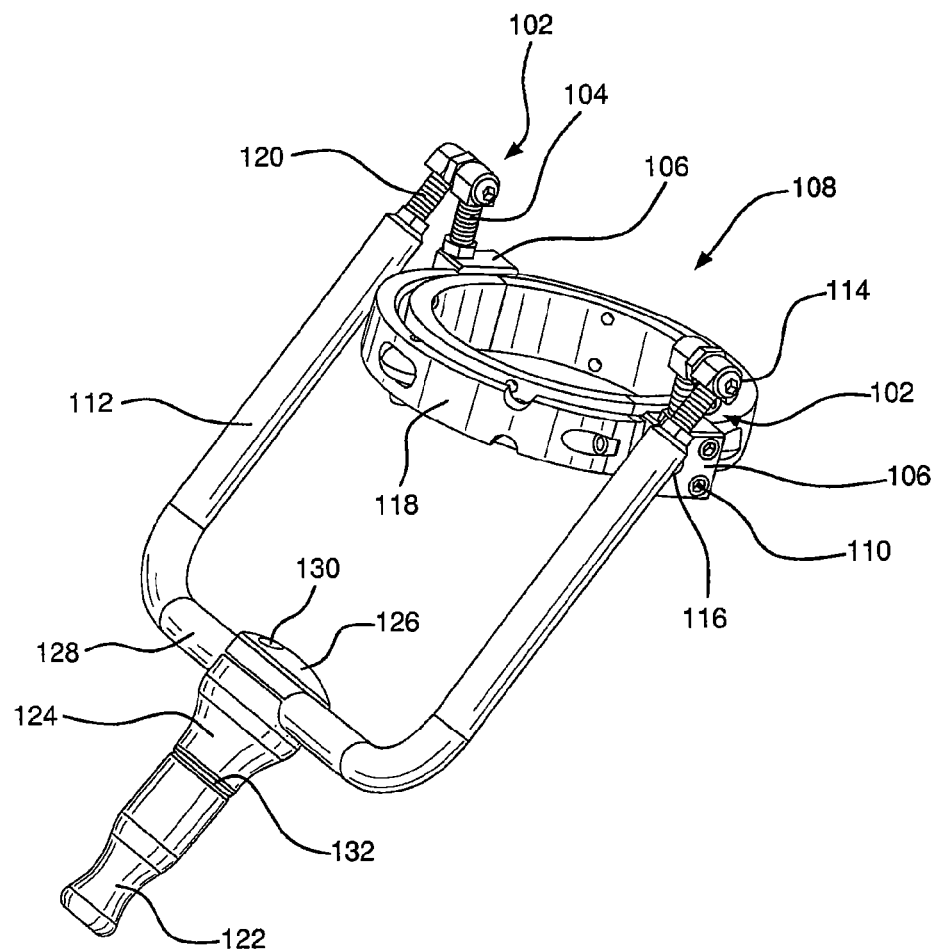
FIG. 9 depicts a gimbal assembly according to a further illustrative embodiment of the invention.

FIG. 9 depicts a gimbal assembly 108 according to an illustrative embodiment of the invention wherein an alternative to pivot-mounting 'ears' 31 (shown in FIG. 7) is provided. In both instances the pivot mounting ears offset the outer gimbal portion pivot locations from the plane of the outer gimbal portion. The pivot ears 102, shown in FIG. 9 however, include an adjustment mechanism to vary the position of the tool holder with respect to the yoke. The mechanism shown in FIG. 9 includes threaded members 104 attached to blocks 106. Blocks 106 are disposed on opposite sides of gimbal assembly 108. Threaded members 104 can be lengthened or shortened by rotating them with respect to blocks 106. Threaded members 104 are pivotally attached to yoke 112 at pivot locations 114. In this particular embodiment of the invention, threaded members 104 are inserted into blocks 106 and adjusted to the desired length. Blocks 106 are then attached to gimbal assembly 108 by screws 110. The particular embodiment of the invention shown in FIG. 9 has axle mounting locations 116 (partially shown) on blocks 106 to allow gimbal assembly 108 to be disposed within yoke 112 such that the pivot axis extends through outer gimbal portion 118, rather than it being offset using threaded members 104. Other mechanisms for displacing outer gimbal portion 118 away from the pivot axis are within the scope of the invention. For example, telescoping mechanisms with appropriate stops and locking mechanisms can be used.

FIG. 9 also depicts yoke arm extension members 120. Yoke arm extension members 120 function in a similar manner to threaded members 104, and also can be substituted with other extension mechanisms such as telescoping extensions. The offsets provided by threaded members 104 and extension members 120 can facilitate installation and use of tools of sizes and shapes that are not compatible with the non-extended yoke arms or the gimbal assembly in its non-offsetted position.

FIG. 9 also depicts a yoke mounting mechanism 122 having a first end attached to yoke 112 and a second end attached to an articulating arm or part intermediate thereto. Yoke mounting mechanism 122 comprises two attachment parts 124, 126 which either separate completely from one another or are hinged together, so they can be positioned to encircle the top bar 128 of yoke 112. A screw 130 or other fastener secures yoke mounting mechanism 122 to yoke 112. It is also possible for yoke mounting mechanism 112 to slide on to yoke top bar 128. Yoke mounting mechanism 112 optionally pivots at location 132. If no pivot is provided on yoke mounting mechanism 112, the yoke can be pivotally connected to an articulating arm or intermediate component to obtain an analogous degree of freedom.

A number of embodiments of the invention will now be generally described. In illustrative embodiments of the invention, the support and orienting apparatus will comprise a tool holder (such as inner gimbal portion 9) to secure the tool within the apparatus. To provide freedom of movement of the tool analogous to arm and wrist rotation for example, the secured tool will rotate within an outer component (such as outer gimbal portion 7). The inner and outer gimbal portions each have a rotation component complimentary to one another that allows or facilitates the inner gimbal portion rotating within the outer gimbal portion. An example of complimentary rotation components are inner gimbal portion race 19 ("first rotation component") and outer gimbal portion wheels 16 ("second rotation component"). The receptacles are preferably designed to facilitate removal or replacement of tools or tool components. Various configurations can be used to accomplish this, such as the arcuate segmenting shown in the figures (for example major and minor segments 14 and 15, respectively). The number of segments and the means for attaching them to one another can vary, provided they withstand the anticipated application of the device. Quick release, or hand-removable attachment mechanisms lend themselves well to the goal of easy tool replacement. As shown in FIG. 4*a*, for example, segments of the outer gimbal portion can be hinged. Hinging can also be used for the inner gimbal portion.

The inner gimbal portion will have a tool grasping mechanism such as set screws or clamps. Any mechanism that adequately secures the tool in the inner gimbal portion is within the scope and spirit of the invention.

The inner and outer gimbal portion combination can pivot on a yoke such as part 4 in the figures. The shape of the yoke can vary from the U-shape shown in the diagrams, for example for particular types of tools or applications. The primary function of the yoke structure is to support the gimbal portions and provide a frame for an additional axis of rotation. In the illustrative figures, the inner gimbal portion has an axis of rotation with respect to the outer gimbal portion that is substantially perpendicular to the axis of rotation of the outer gimbal portion with respect to the yoke.

The yoke is preferably pivotally connected to a yoke support (such as part 44 in FIG. 1*b*). It is noted that the yoke support can be pivotally connected directly to the outer gimbal portion, thereby eliminating the U-shaped portion of the yoke structure. This removes the degree of freedom provided by the pivotal connection between the yoke and yoke support, however that degree of freedom can be created by additional pivoting components.

The yoke support can be pivotally attached to a support arm, such as articulated arm 8.

Turning back to FIG. 1*a*, support arm 8 and other articulated arms will be described in more detail. The lifting structure or arm attached to embodiments of the inventive gimbal assembly comprises for example, a double section parallelogram spring arm, with preferably reduced friction joints, including, starting at the proximal end: a hinge with one or more vertical pivots, a first parallelogram segment with four horizontal pivots, a central hinge with one or more vertical pivots, a distal parallelogram segment with four horizontal pivots and a distal vertical pivot. A single parallelogram arm may also be used. Various other hinges, pivots and fastening components may also be employed.

Various spring powered 'equipoising' parallelogram arms, such as those employed to support and position objects such as lamps, x-ray machines and dental equipment, can be employed in embodiments of the invention. These arms rely to a greater or lesser extent on friction to retain a selected angle or position, but do not necessarily provide consistent lift throughout the entire angular excursion of the parallelogram links. Arms having consistent lift can be particularly useful for many applications of embodiments of the invention. Arms that also may be appropriate include those described in applicant's U.S. Pat. No. 4,017,168 (Re. 32,213), the diagrams of which are incorporated herein by reference. Applicant's U.S. Pat. No. 5,360,196, diagrams of which are also incorporated herein by reference, provides examples of iso-elastic arms that will be particularly suitable for use in illustrative embodiments of the invention. "Iso-elastic" as used herein describes the consistent lifting performance of these arms in which the fixed weight of the object being lifted is supported throughout the vertical range of articulation with nearly constant buoyancy.

Arms described in applicant's application no. PCT/US2006/014036 or U.S. application Ser. No. 11/403,731, Equipoising Support Apparatus, incorporated herein by reference, are also suitable for use with illustrative embodiments of the invention. The applications describe a variety of single-spring geometries employing cams or cranks to dynamically improve lifting consistency and range of parallelogram articulation. The adjustment mechanisms described in the application can be employed in embodiments of the present invention, and can be user-adjusted.

It is noted that other tensioning mechanisms can be used in place of the springs referred to herein.

Hinges, such as those described in patent application PCT/US2008/056511, incorporated herein by reference, also are suitable for use with illustrative embodiments of the invention. Application PCT/US2008/056511 describes a 'biased hinge' that may further improve arm performance by helping to maintain the selected lateral position of the arm segments (which is termed 'centering').

Equipoising arms, such as those described in the patents/applications mentioned above can provide the desired iso-elasticity and lateral and vertical range. Features, such as knob-adjusted payload adjustment to float the range of human arm weights from the lightest to the heaviest, and analogous 'shoulder, upper arm, elbow and forearm' segments can be advantageous to illustrative embodiments of the invention.

A parking device can be incorporated, which may be either electrically or mechanically activated, to permit a tool to be parked in a convenient stable position when not in use. Such devices can include for example, mechanical docking components or magnetic or electromagnetic devices. In an illustrative embodiment of the invention, a hook and mating eye permits immobilizing the entire support arm at a convenient position and height by, for example, swinging over to that position and permitting the hook to rise into the receiving eye. The operator can then open the gimbal gate and remove the tool in order to exchange it with another tool or perform other work with the tool that may preclude or does not require gimbaled support.

Combinations and permutations of any of the features described herein or their equivalents are within the scope of the invention.

Embodiments of the invention also include a method of using a support and orienting apparatus. The method comprises: (1) securing a tool in an inner gimbal portion; (2) securing the inner gimbal portion to an outer gimbal portion, such that the inner gimbal portion rotates within the outer gimbal portion; and (3) attaching the inner and outer gimbal portion combination either directly or indirectly to an articulating arm. The method can further include using the tool to accomplish a task.

A further illustrative embodiment of the invention includes a plurality of tools, each secured in an inner gimbal portion, configured to be inserted into an outer gimbal portion that is a part of a pivoting and articulating support system. The invention further includes a system comprising the plurality of tools, each in an inner gimbal portion, an outer gimbal portion, the outer gimbal portion secured to a frame that can be pivotally attached to an articulated arm. The system can further include the arm.

Further illustrative embodiments of the inventive support system include a yoke, which can take on various forms, but generally supports a gimbal-type apparatus that permits a tool to rotate freely within a ring or circular frame. An illustrative yoke 230 is depicted in FIG. 10. Preferably the yoke contains a pivot at or near the attachment point of the ring to allow the ring to rotate with respect to the yoke. An illustrative pivot is shown in FIG. 10 at 232. Additional yoke features will be described below with regard to the figures.

Figure 12:
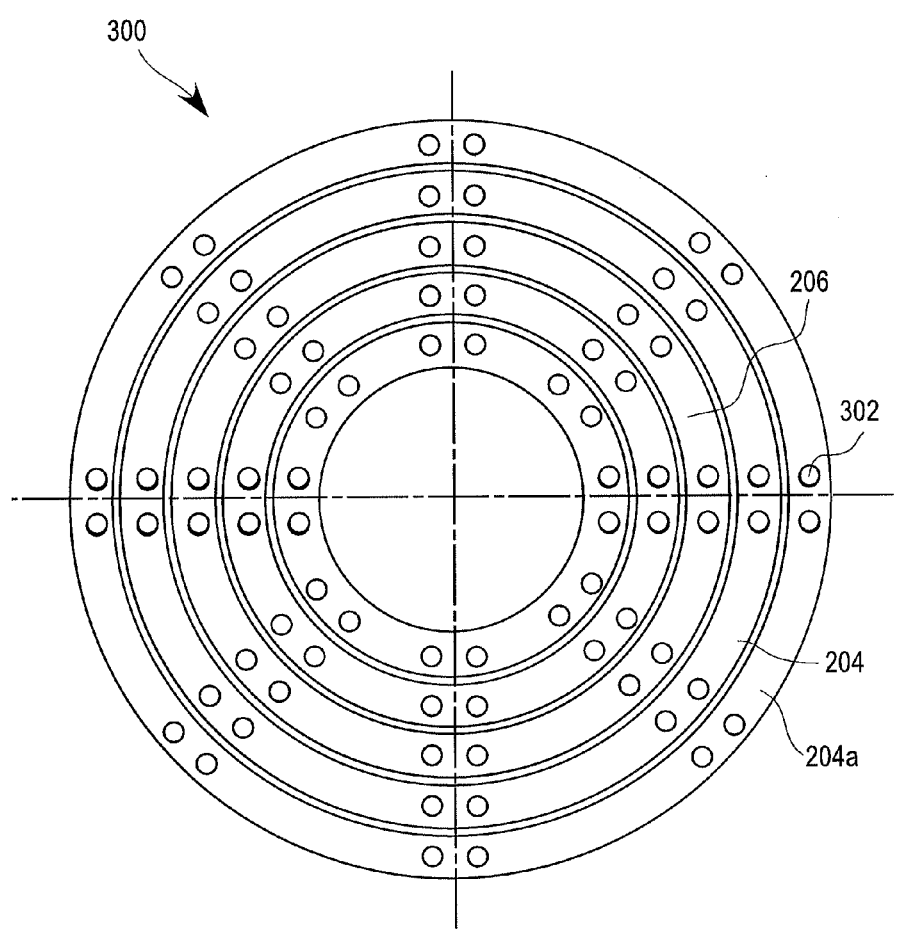
FIG. 12 depicts a series of concentric rings according to an illustrative embodiment of the invention.

The support system generally includes a plurality of concentric rings, from which one or more rings of desired diameter can be selected to form the gimbal section of the support system. An illustrative set of concentric rings is shown in FIG. 12. A system preferably has at least three rings to allow the support system to be used for different tools.

Figure 13:
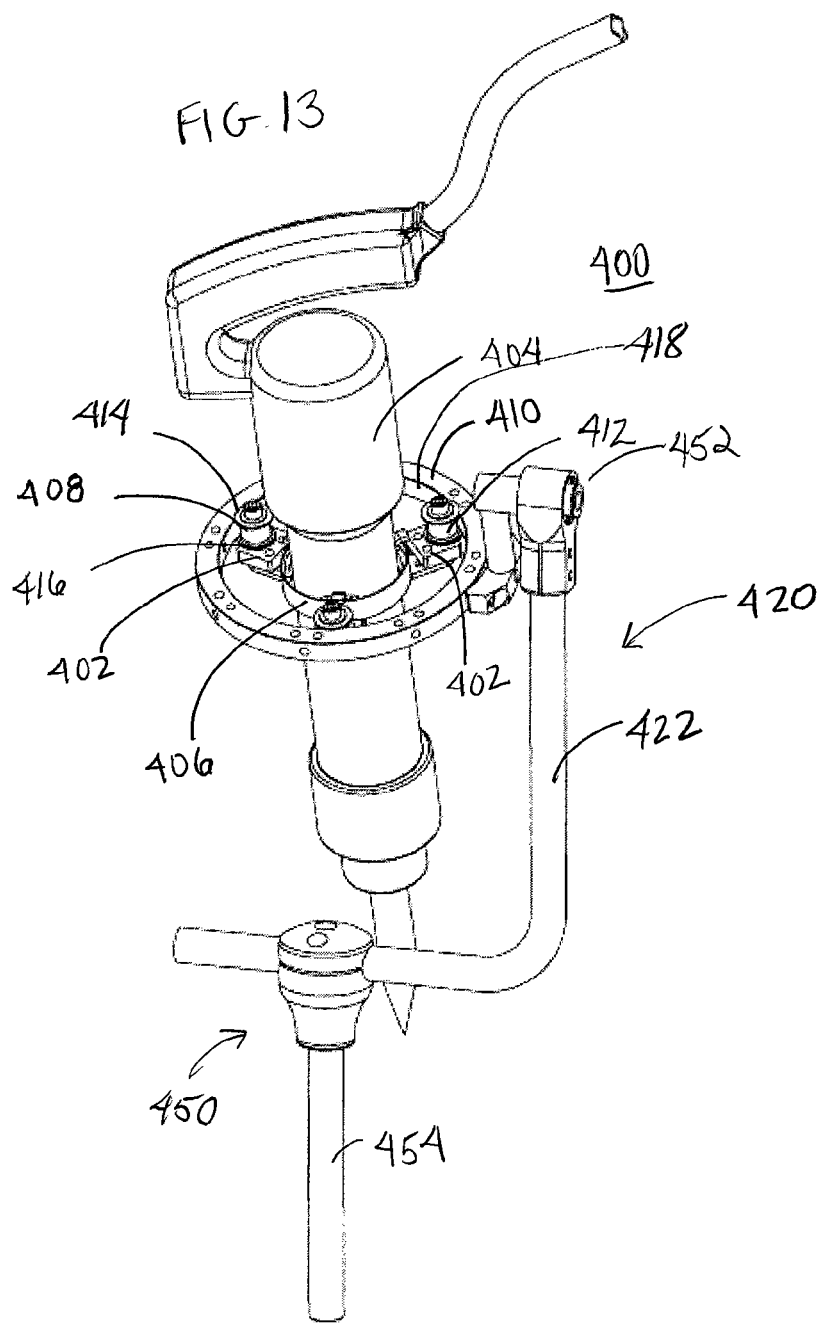
FIG. 13 depicts a tool support with a tool therein according to a further illustrative embodiment of the invention.

The support system includes a tool fastening mechanism engagable with at least one ring and with a tool to secure the tool within the ring. By "engagable" it is meant that the fastening mechanism can be secured directly to the ring or can engage a ring indirectly, such as by a rotation component functionally connected to the fastening mechanism and functionally disposed adjacent to the ring. FIG. 10 shows an example of a fastening mechanism that includes brackets 208, which are secured directly to a ring 206 and directly to a tool 202. FIG. 13 depicts a fastening mechanism that includes brackets 402, which are indirectly engaged with ring 410, by the presence of rollers 408.

The support system further includes one or more rotation components, such as rollers 210, functionally disposed adjacent to at least one ring, thereby allowing the tool to rotate within the concentric rings. Rollers are preferably spool-shaped, having a cylindrical center portion and flanges at one or both ends. Rollers of this form can typically be relatively easily manufactured at a reasonable cost. Their ability to interface with a simple ring shape is also an advantage, as rings can be easily cut from sheets or plates without significant additional machining.

Rotation components can be adjustable from an operational position to a tool removal position. In an illustrative embodiment of the invention, the rotation components are secured to rings or brackets using slotted holes. The rotation components can be loosened and slid along the slot to the extent necessary to remove a ring or tool.

The support system can be configured using a single ring, such as shown in FIG. 13, or can use two or more rings. Use of two rings is seen in FIGS. 10, and 19-21. It is also possible to build out a ring, by fixedly securing (non-rotationally) one or more concentric rings to it. Holes provided in the rings for securing brackets and rollers thereto, can be used to secure a component that would fasten one ring to another. Rings will be selected primarily based on the cross-sectional dimensions of the tool at the location around which the rings will be disposed.

The invention also includes a method of configuring a support system. A support system as described, having a plurality of concentric rings is provided. Included in the system are tool fastening mechanism components, such as brackets, band straps and screws, and rotation components such as rollers and fastening components. A user selects tool fastening components and secures them to the tool. The user also selects one or more rings based on the size of the tool and the support system configuration desired. One selected ring is attached to the yoke and may also be rotationally attached to a second, smaller diameter ring, to which a tool is attached, or to brackets attached directly a tool. Rotation components are selected and also attached to the system. Depending on the support system configuration desired, the rotation components may be added before or after ring attachment. The result is a tool being rotationally secured into the support system.

The support system is preferably produced as a kit containing various support system components, such as a plurality of concentric rings, tool fastening mechanism components, rotation components and yoke components. Yoke components may include, for example, a plurality of arms pieces and one or more offset components.

Illustrative embodiments of the invention will now be described in more detail with respect to the figures.

FIG. 10 depicts an illustrative embodiment of a tool support 200 with a tool 202 supported therein. Tool support 200 includes concentric rings 204, 206 pivotal with respect to one another. Brackets 208 are secured to ring 206 and to tool 202 thereby supporting the tool in the ring. Additional brackets, or fewer brackets, may be incorporated to support the tool. Ring 204 is secured to yoke 230. Preferably ring 204 rotates with respect to yoke 230, for example at pivot point 232.

Figure 11C:
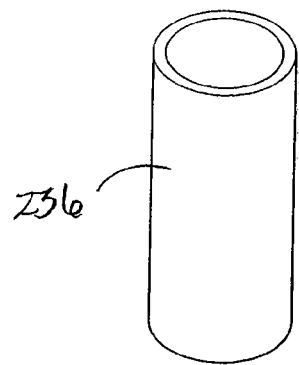
Figure 11D:
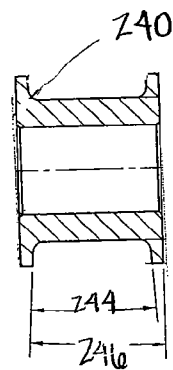

Rollers 210, which serve as rotation components, are attached to ring 204, thereby facilitating rotation of ring 204 within ring 206. As will be seen in other figures and described below, rollers 210 can be secured to an inner ring or to a tool bracket. FIGS. 11A-11d show a roller 210 and associated components according to an illustrative embodiment of the invention. Rollers 210 have a first flange 212 and a second flange 214 as shown in FIG. 11a. Rollers 210 may have bearings 216, 218 disposed within a cylindrical opening 220 in rollers 210. FIG. 11b depicts bearings 216, 218 disposed within roller opening 220. Shown in FIG. 11c is an illustrative embodiment of a roller axle sleeve 236, which can be disposed within openings 226, 228 within bearings 216, 218, respectively to allow rollers 210 to rotate. Roller axle sleeve 236 is longer than roller 210 removing roller 210 from contact with concentric ring 204, thereby allowing roller 210 to rotate freely.

Figure 22:
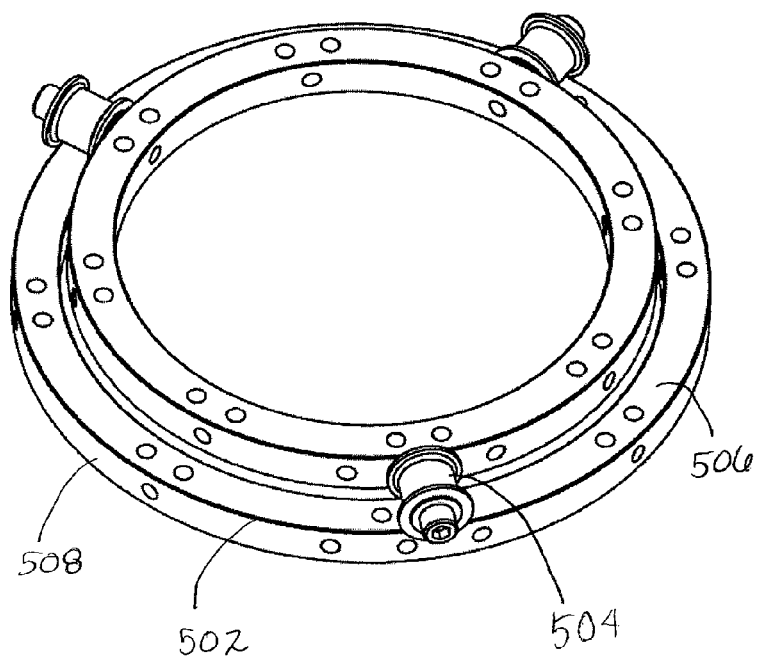
FIG. 22 depicts a gimbal portion of a support system according to an illustrative embodiment of the invention.

As seen in FIG. 10, ring 206 has an outer circumferential surface 222. Outer circumferential surface 222 is longitudinally disposed adjacent to cylindrical portion 224 of roller 210. Flanges 212, 214 partially extend over a top and bottom surface of ring 206 allowing ring 206 to rotate with respect to ring 204, and securing in place ring 206 with tool 202 attached thereto. (Reference to "top" and "bottom" and "above" and "below" herein is made with respect to particular figures and does not limit the tool support components to particular positions.) Preferably the contact between a roller and a ring is only at the sectional corners of the rings and the fillet radius 240 of the roller where the flange meets the cylindrical surface of the roller. Exemplary flange angles 244, 246 are 7.0° and 3.5°, respectively. An illustrative sectional ring corner 242 is shown in FIG. 10 with respect to an axially disposed roller. An illustrative sectional ring corner 502 is shown in FIG. 22 with respect to a radially disposed roller. Having contact restricted to a ring's sectional corner and a flange's fillet radius or radii, can reduce friction and allow looser tolerances. Although the reduced contact configuration will generally be desirable, the scope of the invention includes designs having a ring face in contact with the surface of the cylindrical portion of the roller.

FIGS. 10 and 13, for example, depict axially disposed rollers with respect to rings.

Rotation components can also be radially disposed as shown in FIG. 22. Rotation component 504 has its cylindrical surface disposed adjacent the "top" surface 506 of ring 508. In an illustrative embodiment of the invention, rings have a square cross-sectional shape so that rotation components can be disposed along any side of the rings. This can add to the versatility of the support system.

Figure 21:
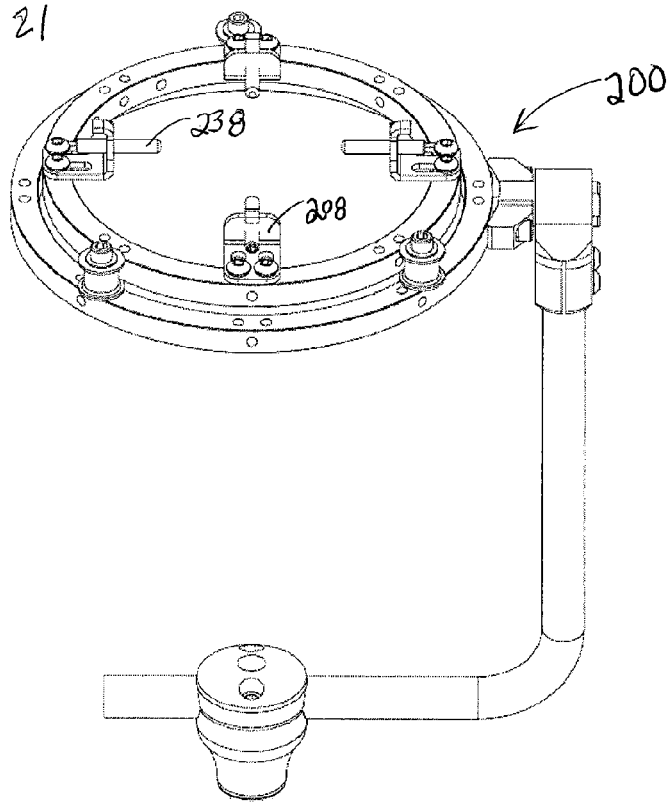
FIG. 21 depicts a support system gimbal section according to an illustrative embodiment of the invention.

FIG. 21 depicts tool support 200 shown in FIG. 10 without tool 202 in place. Brackets 208 have set screws or pins 238.

Set screws 238 are radially adjustable to secure a tool in the support structure. A set screw design facilitates attaching a tool having an irregular surface at the plane of its center of balance.

FIG. 12 depicts a set of concentric rings 300 according to an illustrative embodiment of the invention. Concentric rings 300 can be part of a tool support system such as that which is depicted in FIG. 10. By providing a series of concentric rings as part of a system, users can select two or more rings suitable for a particular tool. This makes the tool support very versatile, enabling it to be used with a variety of tools. Since each ring can be cut from the same plate, each ring has the same thickness providing circumferential outer and inner surfaces that can engage the same rotation components such as rollers 210.

Rings are provided with holes 302, for attaching rotation components and tool fastening components. FIG. 12 depicts each ring having the same number and size of holes 302, with holes 302 spaced equally around the rings. Rings can be provided with other configurations of holes, which may depend for example on the types of rotation and tool fastening mechanisms employed. Two or more rings may have a different hole configuration, however, it will likely be beneficial to have them uniform to accommodate the same fastening and rotation components.

A user selects a ring of suitable size to accommodate the tool being supported. In the illustrative embodiment shown in FIG. 10, brackets 208 are attached to tool 202 and then attached to the selected ring (in this case ring 206). A second ring is selected (in this case ring 204) which will be engaged with ring 206 via rollers 210. FIG. 12 shows an example of which rings may be rings 204, 206. It would also be possible, for example, to secure tool 202 to ring 206 and secure ring 206 non-rotationally to ring 204, then secure ring 204a to yoke 230. This would position tool 202 farther from arm 234 of yoke 230 as compared to using only rings 204 and 206. The embodiment shown in FIG. 10 has rollers 210 attached to a top surface of ring 204 and extending above it. When ring 206 is functionally connected to rollers 210, it is offset "above" ring 204. Using additional rings further offsets the rings. Offsetting the rings along the central axis of rotation can be advantageous because it permits the center of gravity of tool 202 to be adjusted with respect to the pivot point 232.

Because each ring includes a plurality of holes, tool fastening components and rotation components can be fastened to any ring. Holes can also be used to accommodate fastening mechanisms to secure one ring non-rotationally to another. If for example, rollers are disposed on ring 204a, and various tools have rings of different diameters attached to them, ring 204a can be built out as needed using any number of concentric rings to reach a ring of any size that is attached to the tool.

It is noted that ring 210 can have only one flange, for example flange 214. As can be seen in FIG. 10, if flange 214 was not present on any rollers 210, ring 206 could be lifted out of the support structure. This facilitates removal, installation or replacement of tools. Each tool to be used in the support structure can be provided with rings secured thereto, so that removal of a tool and replacement with another tool would merely entail lifting the first tool out of the structure and dropping in a second tool. A mechanism can be provided to secure the tool into the support system so it does not lift out of the ring when in operation, or the rotation of the ring with respect to the yoke can be limited so that gravity could keep the tool in place. It is noted that not all rollers need to be flangeless at one end to permit ring 206 to be removed. For example, in a two roller system, only one roller may need to be flangeless at one end.

Figure 14:
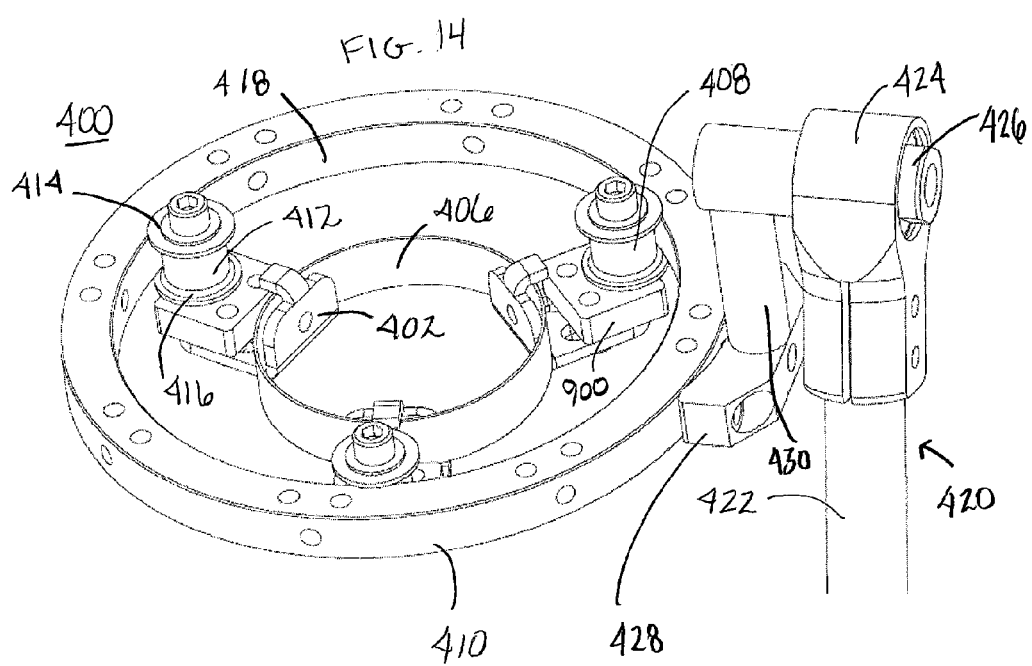
FIG. 14 depicts an enlarged view of a portion of FIG. 4 without a tool.

FIG. 13 depicts a tool support 400 with a tool 404 supported therein according to a further illustrative embodiment of the invention. FIG. 14 depicts a portion of tool support 400 without tool 404 suspended therein. Brackets 402 are attached to tool 404 by means of a strap 406, such as a hose clamp. When using a band strap, only two, and possibly just one bracket is needed, but additional brackets may add support. In this embodiment, rollers 408 are attached to brackets 402. Rollers 408 interface with ring 410 to permit tool 404 to rotate with respect to ring 410. Rollers 408 have a cylindrical portion 412, with flanges 414, 416 at either end. Cylindrical portion 412 is juxtaposed an interior circumferential surface 418 of ring 410. Rollers 408 are held in place with respect to ring 410 by roller flanges 414, 416.

Brackets 402 may be secured to tool 404, for example by screws, with strap 406 adding to the structural integrity. Brackets 402 can also be moveable with respect to tool 404, but held in place by strap 406. In such a configuration, brackets 402 can be slid around tool 404 upon loosening of strap 406, which in turn loosens the bracket and tool combination from ring 410.

Additional circumferential rings can be added around ring 410 to space tool 404 farther apart from yoke 420, or added within ring 410 to accommodate smaller tool/bracket combinations.

Figure 15:
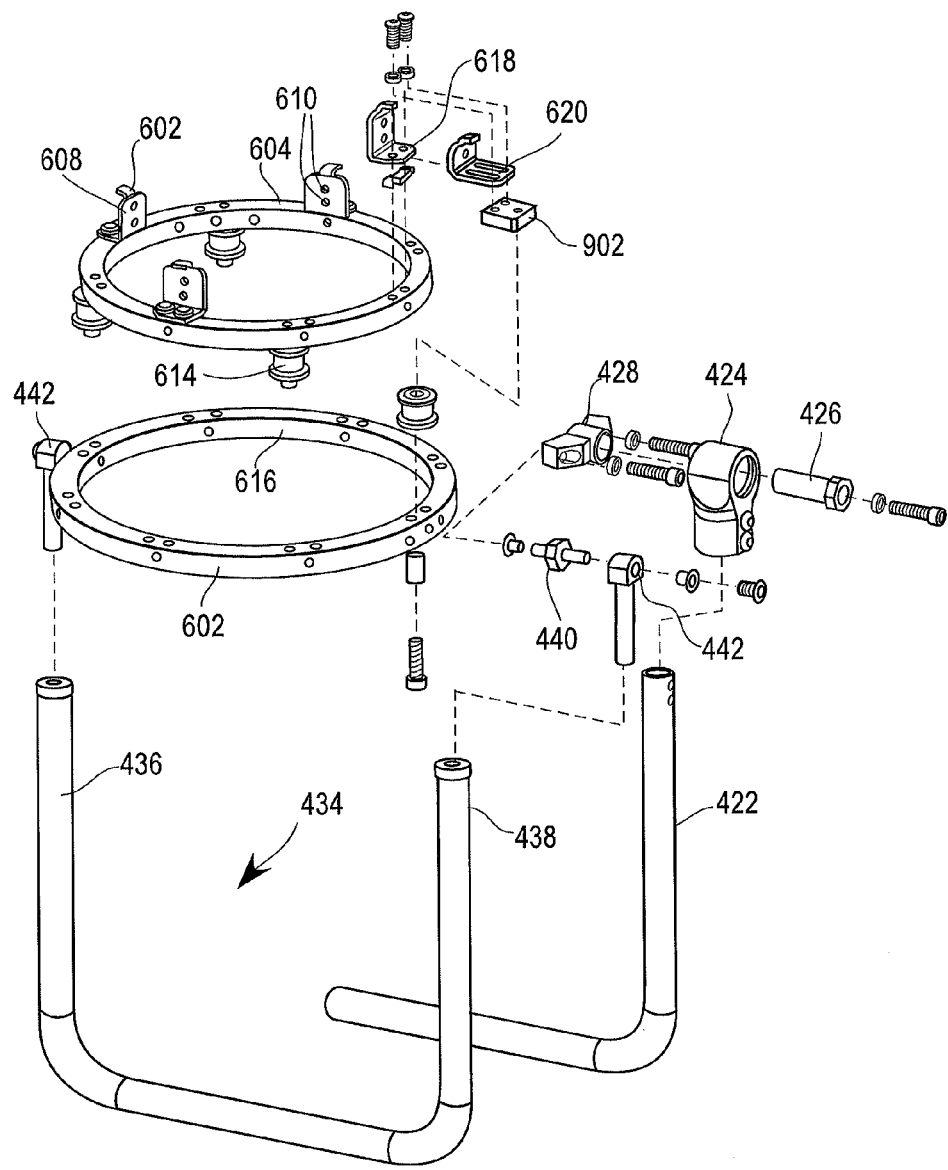
FIG. 15 depicts an exploded view of a tool support system according to an illustrative embodiment of the invention.
Figure 20:
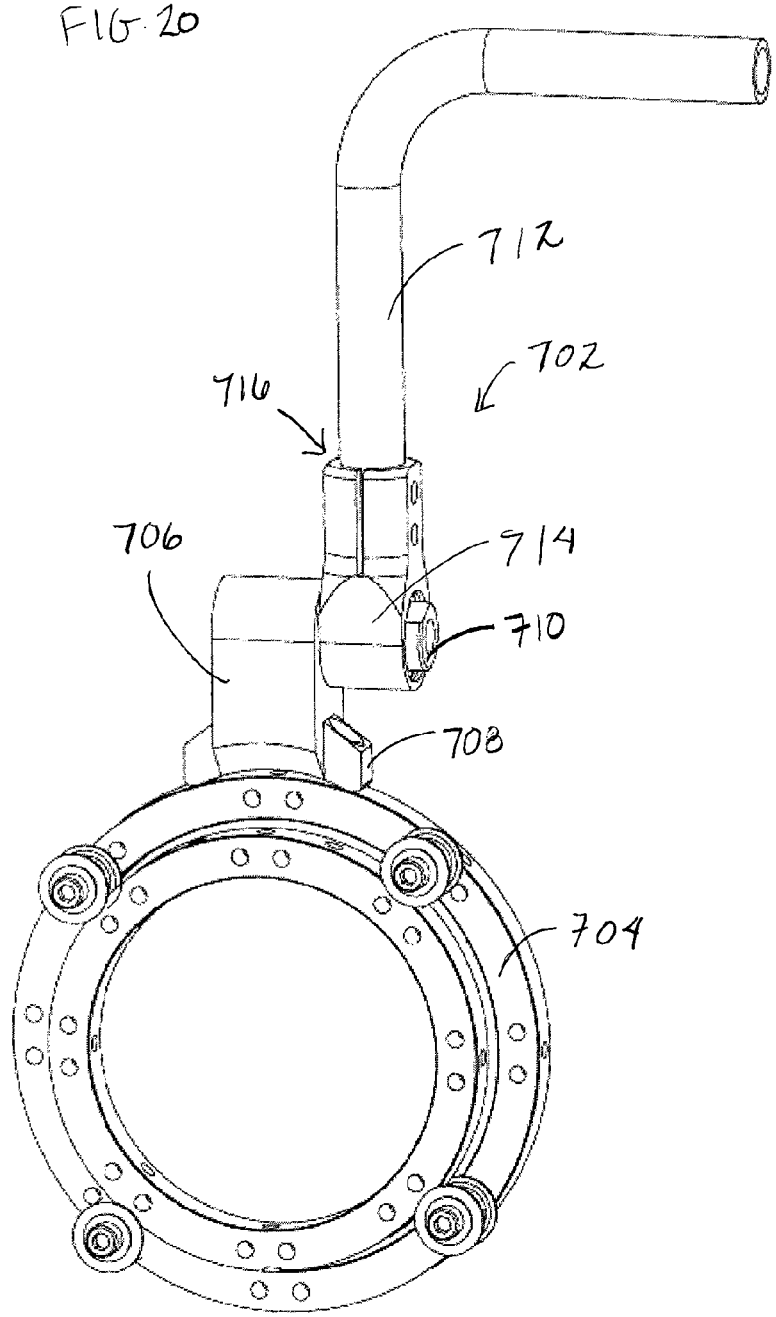
FIG. 20 depicts a one arm yoke section according to an illustrative embodiment of the invention.

The illustrative yoke 420 depicted in FIG. 13 has a single arm 422. Details of the yoke adjacent to the ring interface can be seen in the close up depicted in FIG. 14 and the exploded view shown in FIG. 15. Arm 422 is attached to a bearing housing 424. Bearing housing 424 is bolted into arm 422. Pivot 426 extends through bearing housing 424 and allows the ring/tool assembly to pivot with respect to yoke 420. Yoke clamp 428 can interface directly to pivot 426 and bearing housing 424 as shown in FIG. 15 or can be affixed to an offset component 430, as shown in FIGS. 14 and 20. Offset component 430 permits the yoke pivot axis to be selectively offset from the tool's center of gravity. This allows the tool to be secured in the support apparatus at a convenient location on the tool body, while keeping the center of balance of the tool in appropriate alignment with yoke pivot 426.

FIG. 20 depicts a yoke 702 offset from a ring 704 by an offset component 706 according to an illustrative embodiment of the invention. In this configuration, yoke clamp 708 is disposed parallel to the axis of rotation about pivot 710, which is contained in bearing housing 714. In this configuration, ring 704 can hang in a vertical plane, thereby permitting the tool to be rotatable around a roughly horizontal axis without having to manually pivot it into that position. A pivot perpendicular to pivot 710 can be employed at 716 or elsewhere on yoke 702. FIGS. 13 and 14 show a different configuration wherein the yoke clamp 428 is perpendicular to the axis of rotation of pivot 426. In this configuration, ring 410 would generally rest in a substantially horizontal plane, subject to how the tool is situated in the support apparatus. Additionally, ring 410 can rotate about pivot 452 by 360° because it clears arm 422, although various tools could limit this rotation.

Figure 19:
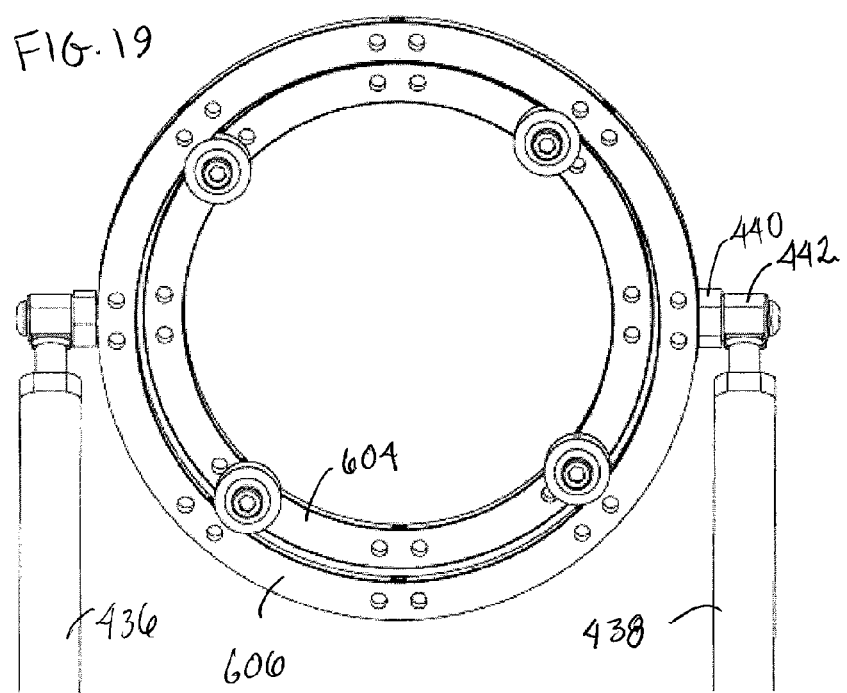
FIG. 19 depicts a two arm yoke section according to an illustrative embodiment of the invention.

FIG. 15 also shows a double arm component 434 having arms 436, 438 according to an illustrative embodiment of the invention. Portions of the double arm structure are also shown in FIG. 19. The double arm yoke pivot assembly includes pivot 440 secured into pivot housing 442, which connects to arm 438 and ring 602. A second similar pivot assembly also connects to ring 602 and further to arm 436. The arm portions can be modular, and the user can be provided with a variety of yoke components so the yoke can be configured as desired or as necessary for the type of tool being used and the work being performed. Yoke arm portions can also be formed of continuous tube stock or other suitable material, bent into a desired configuration.

FIG. 13 also shows an additional pivot point at 450. This provides the support structure with three degrees of freedom: tool 404 rotatable within ring 410; ring 410 rotatable with respect to yoke 420 at pivot point 452; and arm 422 rotatable with respect to shaft 454 at pivot point 450.

FIG. 15 further depicts ring 604, which is designed to pivot within ring 602. Ring 604 has brackets 608 connected to a top surface of the ring. A tool can be attached to brackets 608, either by screws extending through holes 610, and/or by a strap that would surround the brackets and be kept from slipping by protrusions 612. Rotation components in the form of rollers 614 extend below ring 604. Rollers 614 have a cylindrical portion with flanges at either end. The surface of the roller's cylindrical portion is juxtaposed to an inner circumferential surface 616 of ring 602 when the rings are in place. The roller flanges form a track to keep ring 604 in place with respect to ring 602 as it rotates therein. Rollers 614 need not have a bottom flange, in which case a tool with ring 604 attached thereto, can be dropped into ring 602.

Figure 16A:
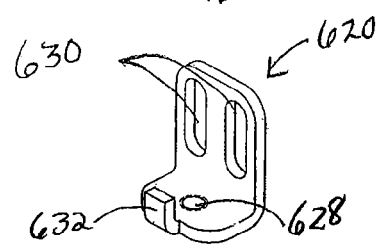
FIGS. 16a-b depict brackets according to illustrative embodiments of the invention.
Figure 16B:
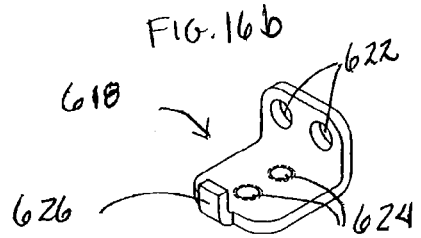

FIGS. 15, 16a and 16b depict two illustrative brackets, 618, 619. Bracket 618 is substantially L-shaped. It has circular holes 622 for attachment of the bracket to a ring or rotation component, and circular holes 624 for attachment to a tool. Protrusion 626 retains a strap used to secure a tool to the tool support assembly. Bracket 620 is also substantially L-shaped and has a single circular hole 628 to secure the bracket to a tool. Bracket 620 has slots 630 through which bolts or other securing component can be disposed to attach the bracket to a ring or rotation component. The slot-shaped opening permits adjustments to the positioning of the bracket with respect to the component to which it is fixed. Bracket 620 also has a protrusion 632, for retaining a band strap. Brackets can have other configurations and distributions, sizes and shapes of holes to accommodate a variety of tools and support structure designs. The illustrative embodiments are relatively easily machinable and provide secure attachment of components and tools.

Figure 17:
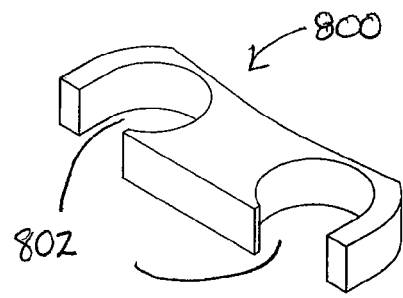
FIG. 17 depicts a spacer to offset brackets from a tool according to an illustrative embodiment of the invention.

FIG. 17 depicts a spacer 800 to offset brackets from a tool, ring or rotation component according to an illustrative embodiment of the invention. Spacer 800 is disposed between a bracket and a ring to which it is attached and extends only partially across the width of the ring. By raising the bracket in this manner, a roller flange can pass by the bracket without interference with it. Openings 802 accommodate bolts or screws that secure a bracket to the ring.

Figure 18:
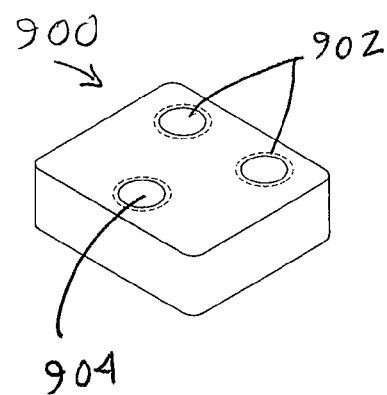
FIG. 18 depicts a roller insert according to an illustrative embodiment of the invention.

FIG. 18 depicts a roller insert 900 according to an illustrative embodiment of the invention. Roller insert 900 and its relationship to other support structure components can be seen in FIGS. 14 and 15. Roller insert 900 is disposed between a bracket, such as bracket 402, and a rotation component, such as roller 408, and secured to the bracket through holes 902. The rotation component is secured to roller insert 900 through hole 904. Roller insert 902 can position rotation components to properly engage with a ring to facilitate rotation of the tool within the ring.

Various components of the tool support system will now be discussed in terms of illustrative dimensions.

The concentric rings can be formed for example from plates or sheets of material such as plastic or metal. In a particular embodiment of the invention the rings are formed from Delrin® or aluminum. An illustrative ring thickness is about 0.5 inches, and illustrative ring thickness ranges include about 0.3 inches to about 0.7 inches; and about 0.4 inches to about 0.6 inches. Thickness is as measured from top to bottom if the ring is in a horizontal plane.

Width is measured from the inner diameter of the ring to the outer diameter. An illustrative ring width is about 0.5 inches, and illustrative ring width ranges include about 0.3 inches to about 0.7 inches; and about 0.4 inches to about 0.6 inches. Concentric rings can be of uniform widths or they can vary. For example, when supporting smaller tools, rings may not need to be as wide, so the smaller diameter rings may have smaller widths.

An illustrative outer diameter of the largest concentric ring is about 8.6 inches. Illustrative ranges of outer diameters of the largest rings are about 10.0 inches to about 7.0 inches; and about 8.0 inches to about 9.0 inches.

Holes in rings are preferably about 0.25 inches in diameter, but can be of any dimensions and spacing according to the intended use of the support structure. Holes can extend through the outer circumferential surfaces of the rings or through the top surface. Holes can also only partially extend into the rings.

An illustrative outer diameter of the smallest concentric ring is about 4.0 inches. Illustrative ranges of outer diameters of the smallest rings are about 3.0 inches to about 5.0 inches; and about 4.0 inches to about 6.0 inches.

Rotation components such as rollers can be fabricated from various materials including metal and plastic. Low friction materials such as Teflon® are suitable as coatings or as the primarily rotation component material. Low friction materials can also be used for the bearings that are disposed at the end of the rollers. Metal rollers can also be a combination of materials, such as stainless steel with low friction materials, such as bronze as a coating.

The cylindrical portion of rotation components such as rollers should be slightly longer than the thickness of the ring with which it will be engaged. An illustrative roller has a cylindrical center portion of slightly greater than about 0.5 inches, with illustrative ranges of about 0.3 inches to about 0.7 inches; and about 0.4 inches to about 0.6 inches. Flanges are preferably about 0.05 inches to about 0.06 inches thick and extend beyond the cylindrical portions of the components by about 0.4 inches to about 0.5 inches.

Roller axle sleeve 236 should extend beyond the sum of the cylindrical portion of the roller and any flanges disposed at the ends. An illustrative sleeve is about 0.7 inches, with an illustrative range of about 0.6 inches to about 0.8 inches.

Illustrative brackets, such as those shown in FIGS. 16a and 16b are L-shaped and have holes and/or slots in both legs of the "L." An illustrative bracket width is about 1.0 inches, with an illustrative width range of about 0.75 to about 1.25 inches. The longer leg of the "L" is about 1.3 inches in an illustrative embodiment of the invention, with an illustrative range of about 1.1 inches to about 1.5 inches. The shorter leg of the "L" has a length within illustrative ranges of about 0.6 inches to about 1.0 inches and about 0.7 inches to about 0.9 inches. The length of the legs of the "L" will depend largely on the component to which it is attached. For example, ring width may dictate the size. The protrusions preferably extend about 0.25 inches above the bracket surface.

Offsets, such as the offset 800 depicted in FIG. 17 have dimensions complimentary to the brackets with which they are used. For example, holes 802 must be aligned with holes in the bracket. Preferably these holes are about 0.5 inches apart from one another as measured center to center. The full width of the spacer need only be sufficient to provide support around the holes. In an illustrative embodiment of the invention the spacers are about 0.8 inches to about 0.9 inches wide. Spacers of various thicknesses can be included with a support system kit. For example, spacers of about 0.1 inches, about 0.2 inches and about 0.3 inches can be included. An illustrative spacer thickness range is about 0.5 inches to about 0.35 inches.

Roller inserts, such as part 900 shown in FIG. 18, are preferably about 1.0 inch wide and 0.5 inches deep. Thickness is preferably in the range of about 0.25 inches to about 0.35 inches, with an illustrative thickness of about 0.5 inches. Holes are spaced to line up with holes in other components such as brackets and rotation components. In an illustrative embodiment of the invention, the center to center distance of holes 902 from one another is about 0.5 inches, and the centerline to centerline distance between hole 904 and holes 902 is also about 0.5 inches. Hole 904 is positioned with respect to the edge of the insert to allow sufficient overhang of a rotation component attached thereto sp it can engage properly with a ring.

Though the invention is described with reference to the particular embodiments of the invention herein set forth, it is understood that the present disclosure is made only by way of example and that numerous changes in the details of construction may be resorted to without departing from the spirit and scope of the invention. Accordingly, it is intended that the invention not be limited to the specific illustrative embodiments, but be interpreted within the full spirit and scope of the appended claims and their equivalents.

The invention claimed is:

1. A support system comprising:
a yoke;
three or more concentric rings capable of being simultaneously attached and having at least one ring pivotally connected to the yoke to form a gimbal;
a tool fastening mechanism interchangeably affixed to at least one ring to secure the tool within the at least one ring;
one or more rotation components functionally disposed adjacent to at least one ring thereby allowing the tool to rotate within at least one of the concentric rings;
wherein one or more of the concentric rings are capable of being added to the system or removed from the system to accommodate tools of different sizes.

2. The support system of claim 1 wherein the ring adjacent to the rotation component has a circumferential surface and wherein the rotation component comprises:
a cylindrical portion having a flange at a first end, wherein the cylindrical portion is longitudinally disposed adjacent to the circumferential surface.

3. The support system of claim 2 wherein the rotation component further comprises a flange at a second end of the cylindrical portion.

4. The support system of claim 3 wherein the rotational component has a first position and a second position with respect to the adjacent ring, wherein the first position is an operational position allowing the tool to remain supported by the system and wherein the second position allows the tool to be removed from the support system.

5. The support system of claim 1 wherein;
the tool fastening mechanism comprises one or more brackets configured to be connected to a tool; and
the rotation component comprises a plurality of rollers, each roller rotationally connected to one of the one or more brackets;
wherein the rollers are disposed adjacent to an inner circumferential surface of a ring.

6. The support system of claim 1 wherein;
the brackets are attached to the tool with a strap; and
wherein the brackets are moveable along the strap around at least a portion of the tool, thereby increasing the space between the tool and an adjacent ring allowing the tool to be removed from the ring.

7. The support system of claim 1 wherein the tool fastening mechanism comprises;
one or more brackets configured to be connected to the tool and to one of the concentric rings; and
wherein the concentric ring to which the brackets are attached is rotatable within another concentric ring.

8. The support system of claim 1 wherein the tool fastening mechanism comprises;
one or more brackets configured to be connected to the tool and to one of the concentric rings; and
wherein the rotation component is rotationally connected to the at least one ring.

9. The support system of claim 1 wherein the yoke has two arms and one concentric ring is pivotally attached to each of the two arms.

10. The support system of claim 1 wherein the yoke has a single arm and one concentric ring is pivotally attached to the single arm.

11. The support system of claim 1 wherein the rotation component comprises:
a roller having a flange on at least one end;
a bearing disposed within the flanged end of the roller; and
a roller axle sleeve disposed within the roller and longitudinally extending beyond the flange.

12. The support system of claim 1 comprising three concentric rings.

13. The support system of claim 1 wherein the yoke comprises:
two or more arm sections having different arm shapes.

14. The support system of claim 1 further comprising:
an articulated support arm attached to the yoke.

15. The support system of claim 1 wherein the yoke structure is pivotally attached to an articulating arm.

16. The support structure of claim 1 further comprising a tool.

17. The support system of claim 1 wherein a cross-sectional shape of the rings is square.

18. The support system of claim 1 wherein the rotation component is disposed radially with respect to at least one of the rings.

19. The support system of claim 1 wherein the rotation component is disposed axially with respect to at least one of the rings.

20. The support system of claim 1 comprising five concentric rings having a total diameter of about 8 inches to about 9 inches.

21. The support system of claim 1 wherein the rings are offset perpendicularly from the central axis of rotation.

22. A method of configuring a support system comprising:
providing a support system as recited in claim 1;
selecting one or more tool fastening components and affixing the tool fastening components to the tool;
selecting one or more rings;
selecting one or more rotation components;
configuring the support system with the one or more rings, one or more rotation components and the tool, to rotationally secure the tool in the system.

23. A support system kit comprising:
a yoke;
three or more concentric rings capable of being simultaneously supported by the yoke to form a gimbal;

a tool fastening mechanism interchangeably affixed to two or more of the concentric rings;

a plurality of rotation components interchangeably engagable with the plurality of rings to allow a tool to rotate within concentric rings;

wherein one or more of the plurality of concentric rings are capable of being added to or removed from the system to accommodate tools of different sizes.

24. The support system kit of claim 23 wherein the yoke is modular and wherein the modules include:

a plurality of arms pieces; and one or more offset components.

25. The support system kit of claim 23 wherein the rotation components comprise:

a cylindrical portion having one or more flanges.

26. The support system kit of claim 23 wherein;

the tool fastening mechanism comprises one or more brackets configured to be connected to a tool.

27. The support system kit of claim 26 further comprising;

a strap configured to engage with the brackets, to hold the tool to a ring.

28. The support system kit of claim 23 comprising five concentric rings.

29. The support system kit of claim 23 further comprising:

an articulated support arm attachable to the yoke.

* * * * *